United States Patent [19]
Sato et al.

[11] Patent Number: 6,072,924
[45] Date of Patent: Jun. 6, 2000

[54] OPTICAL SWITCH AND METHOD FOR ASSEMBLING THE SAME

[75] Inventors: Makoto Sato, Hitachinaka; Fusao Shimokawa, Tokyo; Yasuhide Nishida, Kodaira; Mitsuhiro Makihara, Higashiyamato; Hiroyoshi Togo, Tokorozawa, all of Japan

[73] Assignee: Nippon Telegraph and Telephone Corporation, Tokyo, Japan

[21] Appl. No.: 08/921,603

[22] Filed: Sep. 2, 1997

[30] Foreign Application Priority Data

Sep. 2, 1996 [JP] Japan .................................. 8-231674
May 30, 1997 [JP] Japan .................................. 9-141337

[51] Int. Cl.[7] .................................................. G02B 6/35
[52] U.S. Cl. ........................................... 385/18; 385/16
[58] Field of Search .................................. 385/16, 1, 18, 385/24, 47

[56] References Cited

U.S. PATENT DOCUMENTS

| | | | |
|---|---|---|---|
| 4,789,228 | 12/1988 | Le Pesant et al. | 350/355 |
| 4,896,930 | 1/1990 | Tsuchitani et al. | 350/96.12 |
| 4,988,157 | 1/1991 | Jackel et al. | 350/96.13 |
| 5,699,462 | 12/1997 | Fouquet et al. | 385/18 |

FOREIGN PATENT DOCUMENTS

| | | |
|---|---|---|
| 5-88030 | 4/1993 | Japan . |
| 5-249388 | 9/1993 | Japan . |
| 6-175052 | 6/1994 | Japan . |
| 07092405 | 4/1995 | Japan . |

(List continued on next page.)

OTHER PUBLICATIONS

"Electrocapillarity Optical Switch"; IEICE Trans. Commun., vol. E77–B, No. 2; Makoto Sato, Feb. 1994.
"Dynamics Of Electrocapillarity Optical Switch"; NTT Telecommunication Field Systems R&D Center; Makoto Sato and Hideo Kobayashi, 1993.
"Optical Waveguide Switches Using Oil Movement by Interfacial Tension Control"; NTT Interdisciplinary Research Laboratories; M. Makihara, et al. 1996.
"Self–Latching Optical Waveguide Switches Utilizing Interfacial Tension Control"; NTT Telecommunication Field Systems R&D Center; Makoto Sato and Hideo Kobayashi, 1994.
"Self–Latching Thermo–Capillarity Optical Waveguide Switch"; NTT Opto–electronics Laboratories; Makoto Sato, et al. 1997.

(List continued on next page.)

*Primary Examiner*—John D. Lee
*Assistant Examiner*—Juliana K. Kang
*Attorney, Agent, or Firm*—Venable; Robert J. Frank; Allen Wood

[57] ABSTRACT

An optical switch includes a substrate having therein optical waveguides made of silicon and a silicon layer deposited on its top surface. A space is formed in the crossing portion of the optical waveguides which is covered with a lid, preferably made of low alkali borosilicate glass, and which is bonded to the silicon layer by anodic bonding. Preferably, a groove is formed in a surface of the optical waveguide substrate or a bonding surface of the lid. The groove, after the lid has been bonded, makes a passage which communicates between the space and an outside. The passage is a pouring slit for pouring an index-matching liquid and is connected to the space which acts as a driving slit in which the index-matching liquid moves. In one embodiment, the width of the pouring slit is smaller than that of the driving slit. The optical switch can be manufactured by providing an optical waveguide substrate and a lid substrate, one of which is formed with a groove in its surface on which the two substrates are bonded. The optical waveguide substrate and the lid substrate are bonded together by anodic bonding to make a passage which communicates between the space formed in a crossing portion of the optical waveguides and an outside. The regulation of the volume of the index-matching liquid is time-, temperature-, or pressure-based regulation.

59 Claims, 13 Drawing Sheets

FOREIGN PATENT DOCUMENTS

| | | |
|---|---|---|
| 07289566 | 11/1995 | Japan . |
| 08094866 | 4/1996 | Japan . |
| 08062645 | 8/1996 | Japan . |
| 08201856 | 8/1996 | Japan . |
| 08201857 | 8/1996 | Japan . |
| 09133932 | 5/1997 | Japan . |

OTHER PUBLICATIONS

"New Self–Hold Type Optical Switch Using Matrix Optical Waveguide"; NTT Interdisciplinary Research Laboratories; S. Inagaki, et al. 1992.

FIG.3A  $T_1$
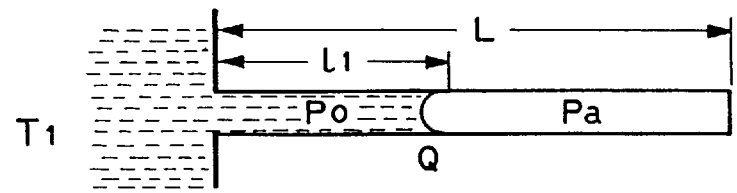
FIG.3B  $T_2$
$T_2 > T_1$
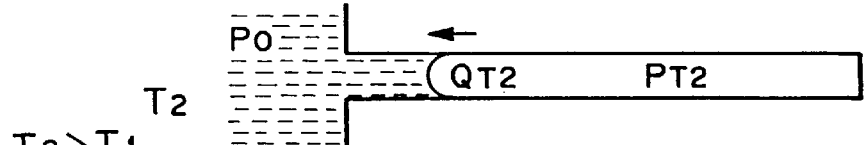
FIG.3C  $T_3$
$T_3 > T_2$
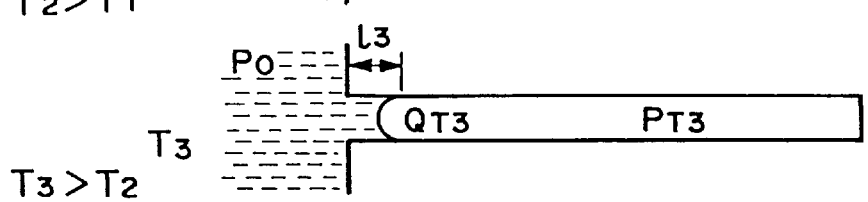
FIG.3D  $T_4$
$T_4 > T_3$
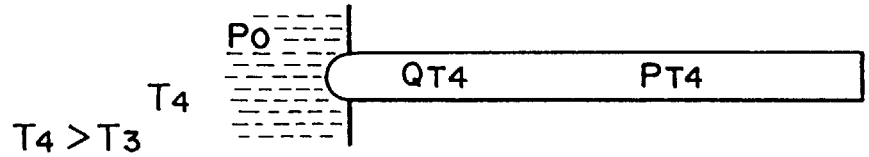
FIG.3E  $T_4$
FIG.3F  $T_4$
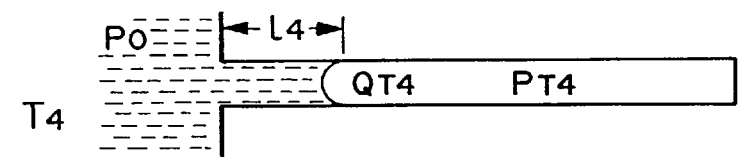
FIG.3G  $T_1$
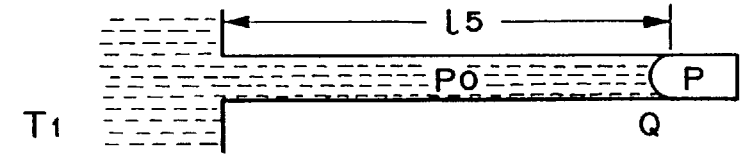

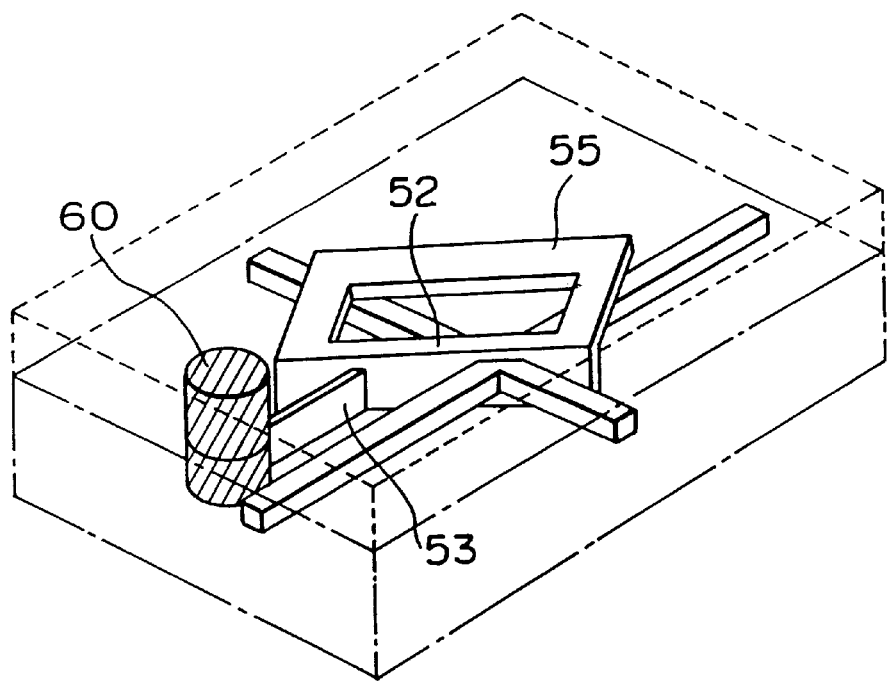
ELAPSE OF TIME ⇩
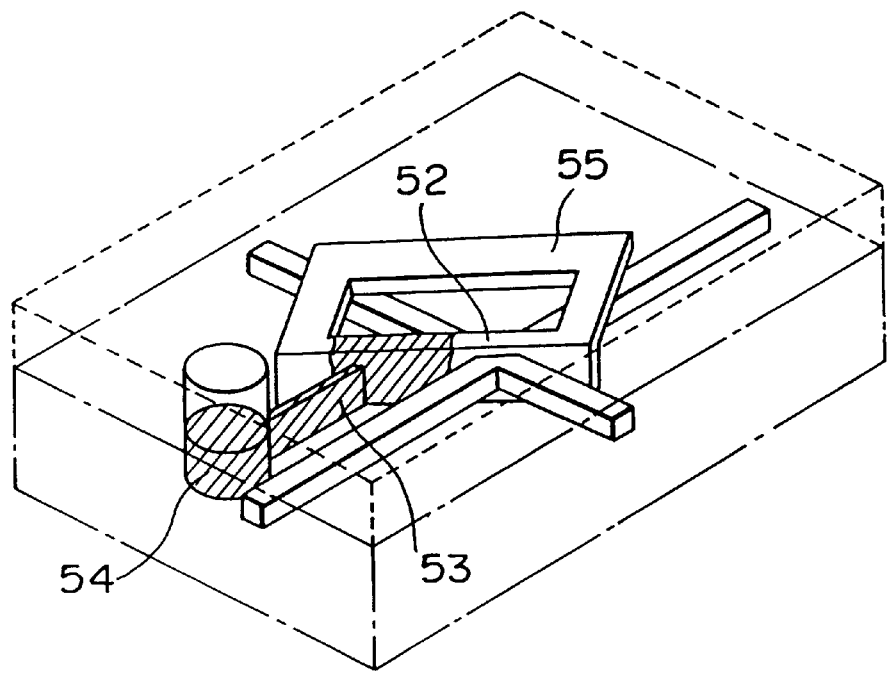
FIG.13

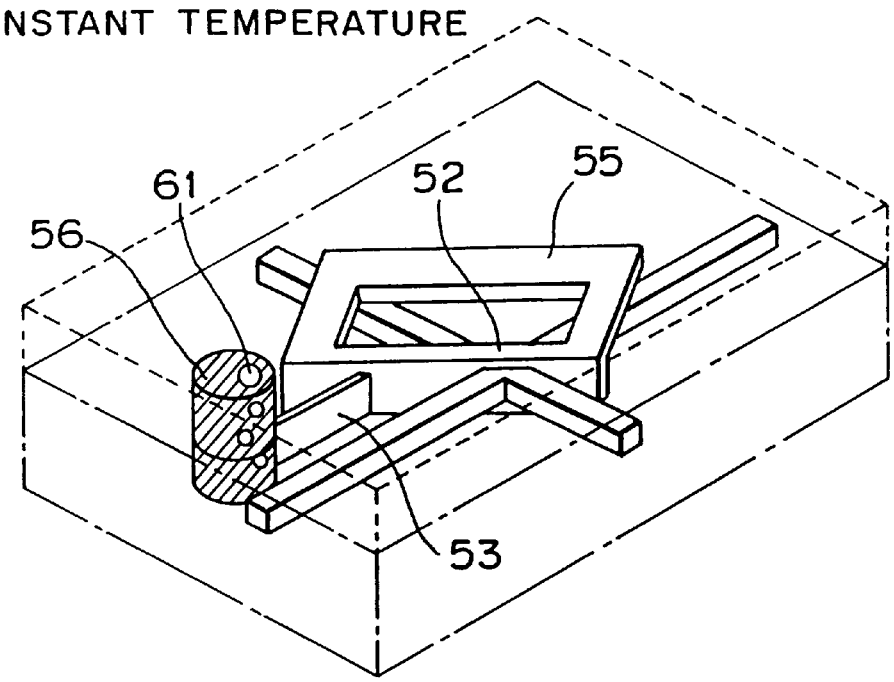
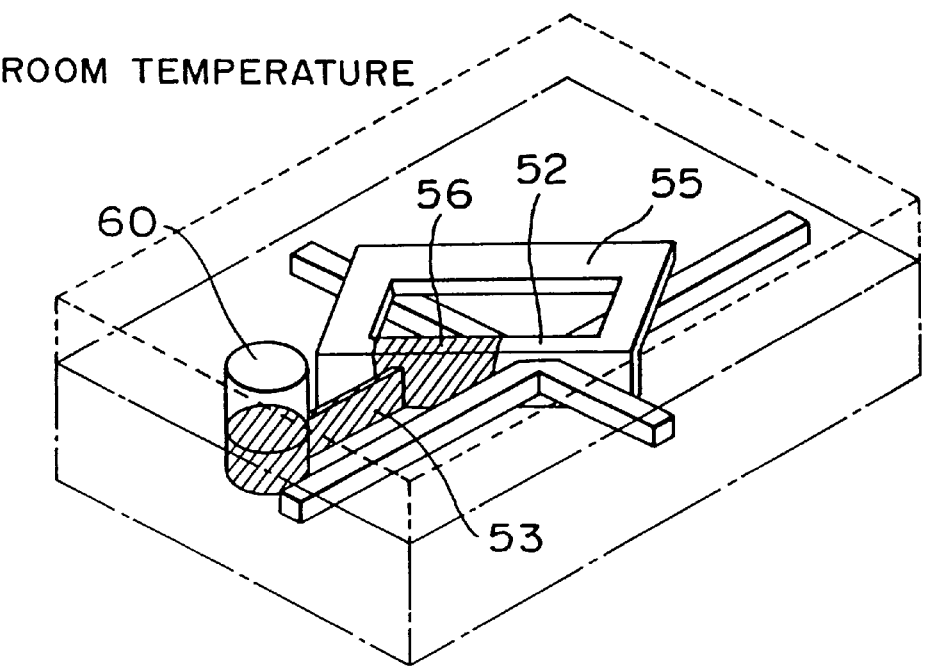
FIG. 14

DECREASED PRESSURE-RETAINED
AT A CONSTANT PRESSURE
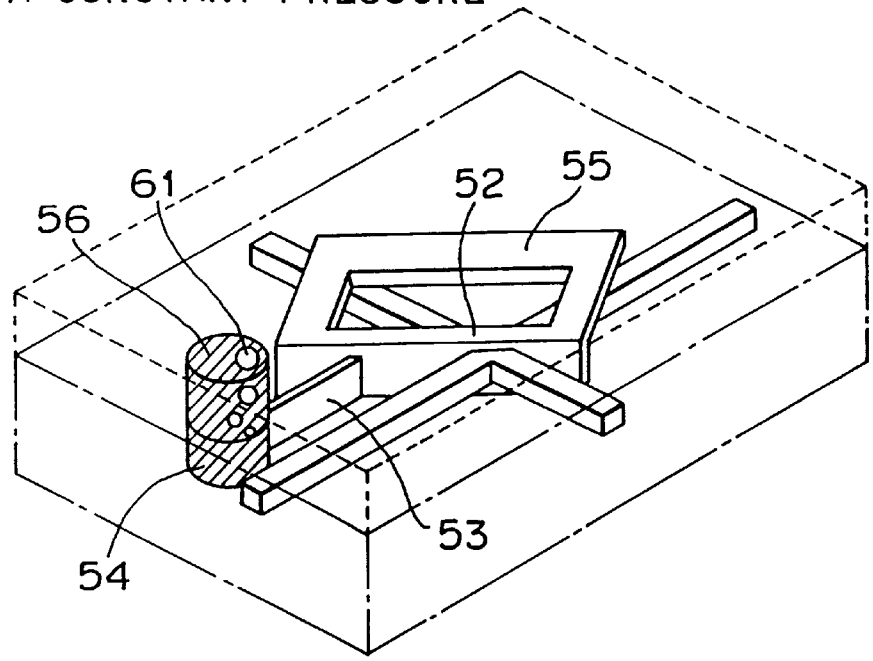
PRESSURIZATION
ATMOSPHERIC PRESSURE
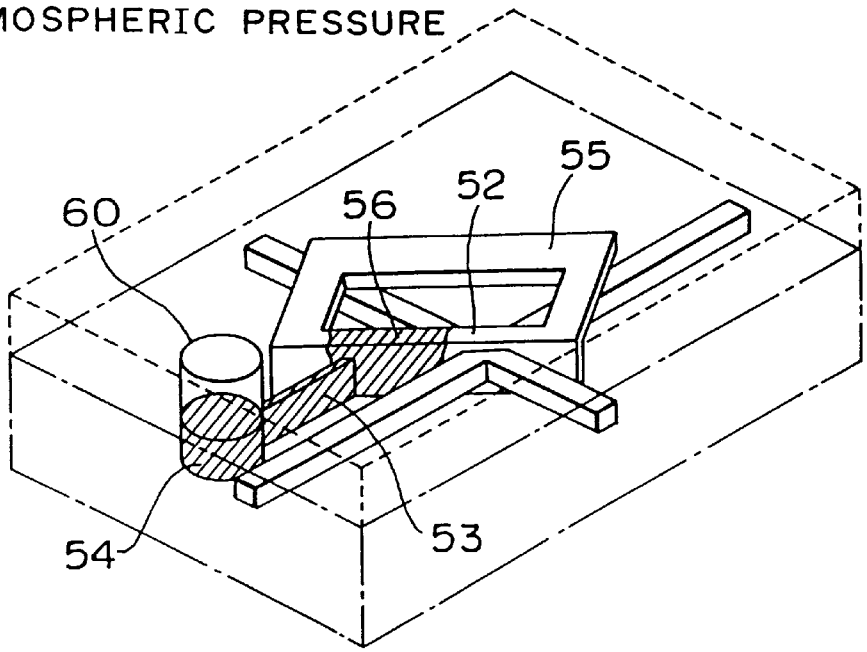
FIG.15

OPTICAL SWITCH AND METHOD FOR ASSEMBLING THE SAME

BACKGROUND OF THE INVENTION

1. Field of the Invention

The present invention relates to an optical switch to be used for setting and switching optical paths in an optical communication system or the like. Particularly, the present invention relates to an optical switch and its assembling method, in which optical paths are switched by changing the conditions of reflection and transmission of light as a result of moving a liquid in a groove (i.e., a gap) formed at some point of the optical path.

2. Description of the Related Art

Heretofore, optical switches for switching optical paths by moving a liquid and methods for manufacturing these optical switches have been proposed The optical switch comprises optical waveguides which are formed in a substrate and cross each other, a groove having a wall surface at a predetermined angle crossed from the optical axis of optical waveguide positioned at the intersection of the optical waveguides, and a refractive index-matching liquid being sealed in the groove. If the groove is empty or is filled with a liquid which does not adjust the refractive index, the optical path switching takes place by reflecting all of the lights on a side wall of the groove. If the groove is filled with a liquid which adjusts the refractive index, the light is guided through the groove.

There has been proposed a method for switching optical paths by pouring a refractive index-matching liquid (i.e., a liquid having the same refractive index as the core of an optical waveguide) into a groove formed in a crossing point of optical waveguides arranged in a lattice pattern (Meeting of IEICE, C-191, 1992).

Likewise, there is another proposal for switching optical paths, where the method includes the steps of generating bubbles by an electrolytic action to remove a liquid in a groove, or disappearing the bubbles by recombination using catalytic electrodes to refill the liquid in the groove (U.S. Pat. No. 4,988,157) .

According to the above two proposals, the groove filled with the refractive index-matching liquid opens to the outside.

As an example of a sealable structure for switching optical waveguides has been proposed one which uses electro capillarity (Japanese Patent Application Laying-open No. 6-175052 (1994); Spring meeting of IEICE, B-807, 1993; IEICE Trans. Com. Vol. E77, No. 2 February 1994). The proposed method includes the steps of supplying mercury and electrolyte in a tube placed at a crossing point of two optical waveguides with different optical axes and switching optical paths in response to the conditions in which a light passes through the tribe or it is reflected by the mercury in the tube. The switching of optical paths sets by the movement of mercury through the application of a voltage between the two electrodes attached to the respective ends of the tube.

Furthermore, Japanese Patent Application Laying-open No. 7-92405 (1995) discloses an electro-capillarity optical switch with a slit in which mercury is moved by an electric capillarity phenomenon. For smoothing the movement of mercury, the optical switch is provided with a groove as an alternative path or bypass through which the electrolyte in front of the mercury is moved to the back of the mercury when the mercury is driven in the slit.

The optical switch disclosed in U.S. Pat. No. 4,789,228 includes two separated prisms facing each other to form a closed space therebetween where two different dielectric liquids are contained without forming an intimate mixture. One of the liquids is responsible for causing the total reflection of light and the other is responsible for causing the transmnission of light. Therefore, the switching of optical paths is performed by converging the higher dielectric constant of the two dielectric liquids on a predetermined position in the closed space through the application of electric field.

There is another type of optical switch in which the movement of liquid to be used for switching optical paths is performed by heating the liquid through a heater arranged near the groove. For example, an optical switch in the type of optical waveguide disclosed in Japanese Patent Application Laying-open No. 5-88030 (1993) performs the movement of liquid as follows. That is, the optical switch comprises an optical waveguide formed on a substrate and a gap in the form of a groove which is formed so as to cross a core of the waveguide, where the gap stores a refractive index-matching liquid having the same refractive index as that of the core. A means for regulating the temperature of liquid (e.g., thermoelectric cooling element) is arranged in proximity to the gap. This element forcefully heats and vaporizes the liquid in the gap or forcefully cools and condenses the liquid.

The optical switch of the type of self-holding disclosed in Japanese Patent Application Laying-open No. 5-249388 (1993) comprises a decompressed space that cross a crossing portion of two optical waveguides that crosses each other and heaters arranged respectively on both ends of the decompressed space.

The waveguide optical switch disclosed in Japanese Patent Application Laying-open No. 8-94866, includes a substrate having deposited thereon a clad formed with a slit which is provided at each end thereof with a liquid reservoir filled with a refractive index-matching liquid. This buffer structure buffers the shock generated when the refractive index-matching liquid moves in the slit to thereby prevent the occurrence of cavitation. Further, the above-described optical switch is provided with at least one groove so as to encircle the slit positioned in a surface of the substrate which surface is to be bonded to a topical cap for sealing the clad formed with the slit.

Furthermore, an optical switch of the type of controlling a surface tension disclosed in Japanese Patent Application Laying-open No. 8-62645 (1996) (Autumn Meeting of IEICE, B-923, 1994) comprises a slit that crosses a crossing portion of optical waveguides, the right volume of a refractive index-matching liquid being poured in the slit, a thermal heater that separates and heats several portions in the slit to provide a gradient of surface tension of the index-matching liquid in the longitudinal direction of the silt. The gradient of surface tension causes the above liquid to move in the slit. A narrowed portion may be formed in the middle of the slit. Also, an alternative path (i.e., a bypass slit) may be formed in the side of a lid substrate or on the side of the optical waveguide substrate.

FIG. 1 shows an optical switch structure according to the previously proposal described technique in Japanese Patent Application Laying-open No. 9-133932 (1997) entitled "Optical Switch". In FIG. 1, the reference numerals 101*i*, 101*o*, 102*i*, and 102*o* denote optical waveguides, 103 denotes a groove in which a refractive index-matching liquid is driven, 104 denotes a refractive index-matching liquid, 105 denotes a groove into which an adhesive is poured (depressed part), and 106 denotes a groove (extruded part) into which an adhesive is poured, 107 denotes an adhesive, 108 denotes an optical waveguide substrate, and 109 denotes an upper substrate.

As shown in FIG. 1, optical waveguides 101i, 101o, and optical waveguides 102i, 102o perpendicular to the former are formed on a surface layer portion of the optical waveguide substrate 108.

In the crossing point of these optical waveguides, a groove 103 is formed in which a refractive index-matching liquid is driven. The groove 103 has a depth enough to block each of these optical waveguides, and also it has a wall surface being inclined so as to reflect an optical signal of the optical waveguide 101i to the optical waveguide 102o. Furthermore, the refractive index-matching liquid 104 in the groove 103 is sealed by covering with a glass plate 109 provided as an upper substrate. On both ends of the groove, heaters are arranged but not shown in the figure because of simplifying the illustration.

In the manufacturing method as described above, the refractive index-matching liquid 104 is poured into the groove 103 and then a glass plate 109 is fixed by an adhesive 107 so as to close an opening of the groove 103 from above.

However, the conventional techniques proposed for optical switches and the above attempts have some disadvantages to be solved with respect to their quality and reliability.

In the open system described above, for instance, there is apprehension that the switching characteristics of the optical switch deteriorate as a result of the evaporation of index-matching liquid, the mixing of dust or the like into the above liquid, or the like. Perfect sealing avoids such disadvantage but such measure cannot be applied to the present invention because of the operating principles of the optical switch.

If the optical switch is of the type which allows perfect sealing, it is very difficult to pour the required amount of the index-matching liquid into the groove and to put the lid on the waveguide substrate and seal off the gap or clearance between the lid and the substrate. The reasons for this are as follows. Firstly, the volume of the groove is on the order of picoliters (pl), so that there is no appropriate means for measuring the volume of the liquid to be injected and nor means for injecting the liquid. Secondly, a glass to be provided as a raw material of the optical waveguide substrate is well wetted and thus the liquid poured into the groove is immediately spread outwardly, so that it cannot be stopped at a desired portion. Thirdly, the liquid that spreads over the glass substrate inhibits wetting of the glass and the adhesive to be used for covering the groove with the lid. Consequently, a stable bonding has not been attained.

Further, when fabrication of matrix type optical switches is contemplated, it is very difficult to perform metering and injecting the refractive index-matching liquid for the groove of each switch and also pouring the adhesive in the groove of each switch.

In the case of the conventional technique illustrated in FIG. 1, the volume of the index-matching liquid 104 to be poured into the groove 103 is extremely small. Dimensions of the groove 103 are approximately 10 μm in width, 40 μm in depth, and 100 μm in length, so that the groove 103 receives the volume of the liquid on the order of several ten pico liters (pl). It is very difficult to measure and pour such small volume of the liquid.

Covering the lid with a groove 103 by using the adhesive 107 causes unstable operation of switching optical paths. In addition, there is the possibility that the refractive index-matching liquid 104 changes in its transparency and refractive index when the liquid contacts the adhesive 107 for a protracted period of time. Consequently, the optical characteristics of the optical switch may he deteriorated. Furthermore, it is the sealing becomes incomplete as a result of deterioration of the mechanical strength of the adhesive 107, the index-matching liquid escapes to the outside. Consequently, the optical switch does not perform the switching operation any longer.

Furthermore, it is difficult to cover the groove 103 filled with the refractive index-matching liquid with the glass plate 109 using the adhesive 107. In general, a silicone oil is used as a refractive index-matching liquid. However, the adhesion properties of the adhesive becomes poor when a silicone oil is present on a surface of the glass that is provided as a raw material of the optical waveguide substrate. The wettability between the silicone oil and the glass is very high, so that it is difficult to prevent the silicone oil from spreading and wetting over the substrate's surface when the silicone oil is poured in the groove. Thus, the sealing with high reliability cannot be attained in the case of fixing the lid through the adhesive 107. Furthermore, a gap is formed between the substrate 108 and the glass plate 109 when the groove 103 is covered with the lid. The gap is narrower than a width of the groove, so that the refractive index-matching liquid 104 tends to escape from the groove 103 to the gap between the substrate 108 and the glass plate 109 by an effect of the capillarity. Therefore, the sealing cannot be completed because of the same reasons as described above.

SUMMARY OF THE INVENTION

As described above, the optical switch having the conventional configuration and its manufacturing method has the disadvantages in the manufacturing process such as the regulation of the volume of liquid to be poured in the groove and the sealing of the liquid in the groove, and also it has poor reliability in optical characteristics concerned with these disadvantages.

Accordingly, the present invention is disclosed for solving the above disadvantages, and aims to provide an optical switch and its manufacturing method with reliability for a long time and with excellent manufacturability.

According to a first aspect of the present invention, there is provided (1) an optical switch comprising: a substrate; a lid fixed to the substrate, defining a space together with the substrate; first and second optical waveguides provided in the substrate, the first and second optical waveguide crossing each other in the substrate; a liquid having a refractive index which is substantially equal to that of the first and second optical waveguides, the liquid being present and movable in the space, thereby switching optical paths in the first and second optical waveguides one from another depending on its position in the space; wherein the substrate comprises a base layer comprising silicon, and a silicon layer deposited on a top surface of the substrate, and wherein the lid is anodically bonded to the substrate through the silicon layer.

(2) In (1) above, the base layer of the optical waveguide may consist of silicon and the lid consists of a Pyrex glass.

(3) In (1) above, the base layer of the optical waveguide may consist of quartz, and the lid consists of quartz having deposited thereon a borosilicate glass or a low alkali borosilicate glass.

(4) In (1) above, the optical switch may be provided with a passage through which the refractive index-matching liquid is poured and which communicates with the space at the crossing portion of the first and second optical waveguides.

(5) In (4) above, the space may comprise a driving slit in which the refractive index-matching liquid is moved; and a pouring slit for pouring the refractive index-matching liquid, communicating with the driving slit and having a width smaller than a width of the driving slit.
(6) In (4) above, the pouring slit may be provided only in one position.
(7) In (2) above, the optical switch may be provided with a passage through which the refractive index-matching liquid is poured and which communicates with the space at the crossing portion of the first and second optical waveguides.
(8) In (7) above, the space may comprise a driving slit in which the refractive index-matching liquid is moved; and a pouring slit for pouring the refractive index-matching liquid, communicating with the driving slit and having a width smaller than a width of the driving slit.
(9) In (7) above, the pouring slit may be provided only in one position.
(10) In (1) above, the optical switch may further comprise means for driving the liquid in the space.
(11) In (10) above, the means for driving the liquid may be means for heating the liquid.
(12) In (11) above, the means for heating may comprise a heater and a circuit for driving the heater.
(13) In (10) above, the means for heating the liquid may create a gradient of temperature along the direction in which the liquid is driven.
(14) In (13) above, the means for heating the liquid may comprise a plurality of heaters.

According to a second aspect of the present invention, there is provided (15) a method of assembling an optical switch, comprising steps of: providing an optical waveguide substrate having formed therein first and second optical waveguides and a lid substrate, one of the optical waveguide substrate and the lid substrate being formed in a surface thereof with a groove communicating with a space provided at a crossing portion of the first and second optical waveguides so that the space communicates with an outside through the groove on the lid substrate has been bonded to the optical waveguide substrate; bonding the optical waveguide substrate and the lid substrate together by means of anodic bonding; and pouring the index-matching liquid from the groove.
(16) In (15) above, the optical switch may further comprise: a driving slit provided as a groove in which the refractive index-matching liquid is moved; and a pouring slit for pouring the refractive index-matching liquid, wherein the driving slit and the pouring slit are connected together, and also a width of the pouring slit is smaller than a width of the driving slit.
(17) In (16) above, the pouring slit may be provided only in one position.
(18) In (16) above, the method of assembling the optical switch may further comprise the steps of: dipping an inlet of the pouring slit into the refractive index-matching liquid; and regulating a volume of the refractive index-matching liquid to be poured into the driving slit by means of time-based regulation.
(19) In (16) above, the method of assembling the optical switch may further comprise the steps of: dipping an inlet of the pouring slit into the index-matching liquid; and regulating a volume of the refractive index-matching liquid to be poured into the driving slit by means of temperature-based regulation.
(20) In (19) above, the step of regulating a volume of the refractive index-matching liquid to be poured into the driving slit by means of temperature-based regulation may comprise sub-steps of: holding a state at a temperature higher than a room temperature for a predetermined time; and returning the temperature to a room temperature.
(21) In (19) above, the step of regulating a volume of the refractive index-matching liquid to be poured into the driving slit by means of temperature-based regulation may comprise sub-steps of: holding a state at a temperature higher than a room temperature for a predetermined time; dipping an inlet of the pouring slit into the refractive index-matching liquid; and returning the temperature to a room temperature.
(22) In (17) above, the method of assembling the optical switch may further comprise the steps of: dipping an inlet of the pouring slit into the refractive index-matching liquid; and regulating a volume of the refractive index-matching liquid to be poured into the driving slit by means of time-based regulation.
(23) In (17) above, the method of assembling the optical switch may further comprise the steps of: dipping an inlet of the pouring slit into the index-matching liquid; and regulating a volume of the refractive index-matching liquid to be poured into the driving slit by means of temperature-based regulation.
(24) In (23) above, the step of regulating a volume of the refractive index-matching liquid to be poured into the driving slit by means of temperature-based regulation, may comprise sub-steps of: holding a state at a temperature higher than a room temperature for a predetermined time; and returning the temperature to a room temperature.
(25) In (23) above, the step of regulating a volume of the refractive index-matching liquid to be poured into the driving slit by means of temperature-based regulation may comprise sub-steps of holding a state at a temperature higher than a room temperature for a predetermined time; dipping an inlet of the pouring slit into the refractive index-matching liquid; and returning the temperature to a room temperature.
(26) In (16) above, the method of assembling the optical switch may further comprise the steps of: dipping an inlet of the pouring slit into the refractive index-matching liquid; and regulating a volume of the refractive index-matching liquid to be poured into the driving slit by means of pressure-based regulation.
(27) In (26) above, the step of regulating a volume of the refractive index-matching liquid to be poured into the driving slit by means of pressure-based regulation may comprise sub-steps of: dipping an inlet of the pouring slit into the index-matching liquid; holding a state at a pressure lower than an atmospheric pressure for a predetermined time; and returning the pressure to an atmospheric pressure.
(28) In (26) above, the step of regulating a volume of the refractive index-matching liquid to be poured into the driving slit by means of pressure-based regulation may comprise sub-steps of: holding a state at a pressure lower than an atmospheric pressure for a predetermined time; dipping an inlet of the pouring slit into the refractive index-matching liquid; and returning the pressure to a atmosphere pressure.
(29) In (17) above, the method of assembling the optical switch may further comprise the steps of: dipping an inlet of the pouring slit into the refractive index-matching liquid; and regulating a volume of the refractive index-matching liquid to be poured into the driving slit by means of pressure-based regulation.
(30) In (29) above, the step of regulating a volume of the refractive index-matching liquid to be poured into the driving slit by means of pressure-based regulation may comprise sub-steps of: dipping an inlet of the pouring slit into the index-matching liquid; holding a state at a pressure lower than an atmospheric pressure for a predetermined time; and returning the pressure to an atmospheric pressure.

(31) In (29) above, the step of regulating a volume of the refractive index-matching liquid to be poured into the driving slit by means of pressure-based regulation may comprise sub-steps of: holding a state at a pressure lower than an atmospheric pressure for a predetermined time; dipping an inlet of the pouring slit into the refractive index-matching liquid; and returning the pressure to a atmosphere pressure.

(32) In (16) above, the method of assembling the optical switch may further comprise the steps of: applying a pressure on the refractive index-matching liquid after performing preceding steps; and removing the pressure from the refractive index-matching liquid.

(33) In (17) above, the method of assembling the optical switch may further comprise the steps of: applying a pressure on the refractive index-matching liquid after performing preceding steps; and removing the pressure from the refractive index-matching liquid.

(34) In (16) above, the method of assembling the optical switch may further comprise the steps of: removing an excess part of the index-matching liquid after pouring the index-matching liquid into the groove; and sealing an opening of the groove with a sealant.

(35) In (34) above, the sealant may be at least one selected from a group of epoxy resin, silicone resin, and silicone rubber.

(36) In (17) above, the method of assembling the optical switch may further comprise the steps of: removing an excess part of the index-matching liquid after pouring the index-matching liquid into the groove; and sealing an opening of the groove with a sealant.

(37) In (36) above, the sealant may be at least one selected from a group of epoxy resin, silicone resin, and silicone rubber.

The above and other objects, effects, features and advantages of the present intention will become more apparent from the following description of embodiments thereof taken in conjunction with the accompanying drawings.

BRIEF DESCRIPTION OF THE DRAWINGS

FIGS. 3A to 3G are schematic cross sectional views that illustrate each step of pouring a refractive index-matching liquid into a grooved portion of an optical switch according to an embodiment of the present invention;

FIG. 13 is a schematic perspective view illustrating the method of manufacturing the optical switch according to a sixth embodiment of the present invention;

FIG. 14 is a schematic perspective view illustrating the method of manufacturing the optical switch according to a sixth embodiment of the present invention;

FIG. 15 is a schematic perspective view illustrating the method of manufacturing the optical switch according to a sixth embodiment of the present invention;

DESCRIPTION OF PREFERRED EMBODIMENTS

Figure 1:
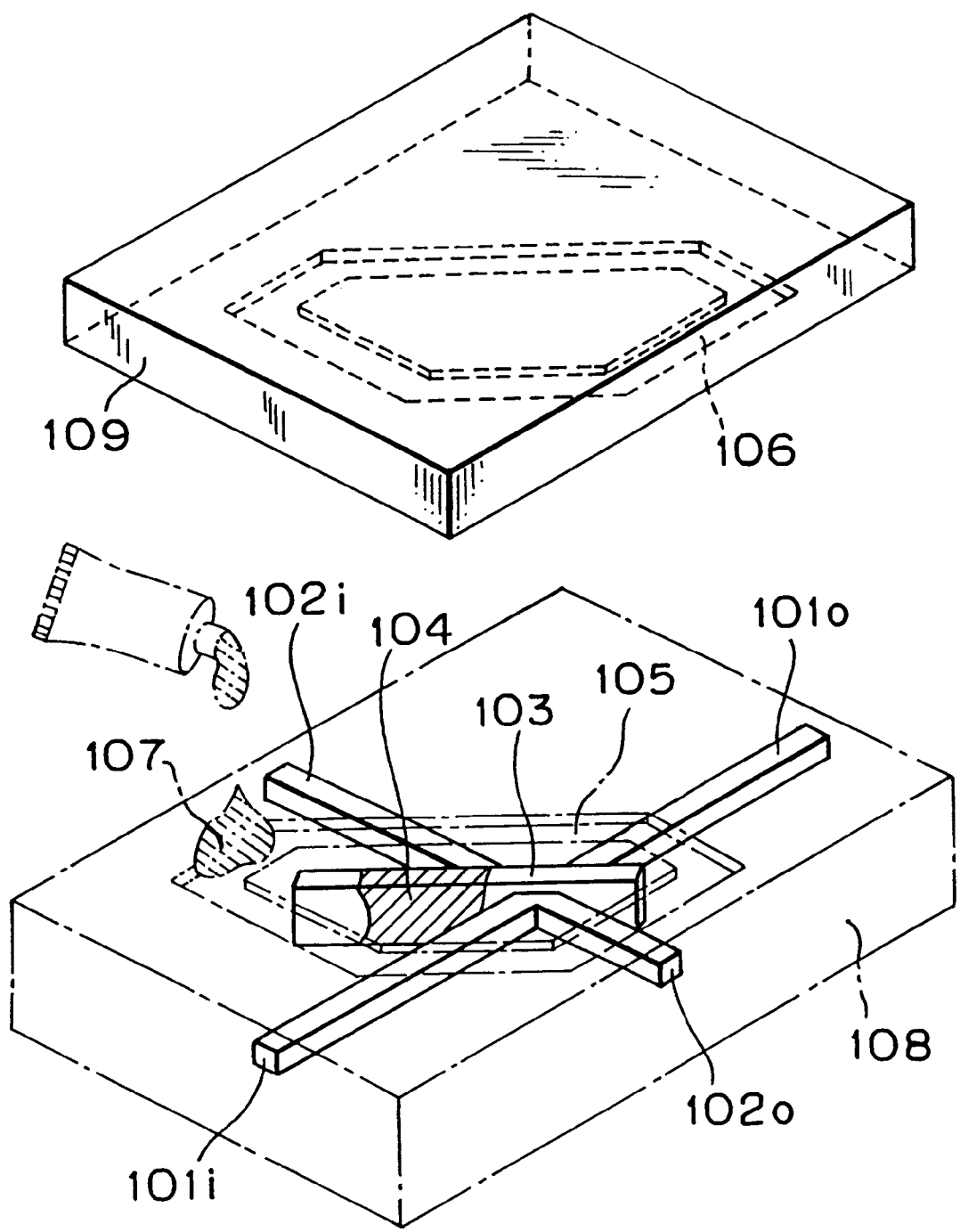
FIG. 1 is a schematic perspective view showing an optical switch which is provided by the prior technique.

The optical switch comprises optical waveguides which are formed in a substrate and cross each other, a groove at the intersection of the optical waveguides, and a refractive index-matching liquid being sealed in the groove.

At the bonding portion of the lid and the substrate, the anodic bonding keeps them in absolute contact with one another, so that it isolates the refractive index-matching liquid from the surroundings, resulting in an advantage of preventing the occurrence of deterioration or evaporation of the refractive index-matching liquid.

The anodic bonding is in the type of direct bonding, so that there is no need to sandwich a polymer material, a metal material, or the like as an adhesive or a sealing material between the bonding surfaces. Thus, such bonding technique lends itself to use for bonding the lid to a substrate of optical waveguide with the need for micro-machining.

Furthermore, the anodic bonding offers other advantages in that there is no need to worry about the deterioration of the refractive index-matching liquid to be caused by an undesired reaction with the adhesive, denaturation of adhesive, or the like.

Conventional anodic bonding techniques to be used in the present invention are described in several references: D. I. Pomerantz, U.S. Pat. No. 3,397,278; G. Wallis & D. I. Pomerantz "Field Assisted Glass-Metal Sealing"; and J. Appl. Phys. pp. 3946–3949, vol. 40, No. 10 September 1969.

Here, it is noted that the anodic bonding technique cannot be applied directly if a silica glass is deposited on a surface of the optical waveguide substrate by means of flame hydrolysis deposition, ion beam sputtering, electron-beam evaporation, or the like.

Therefore, the present invention allows the anodic bonding between silicon deposited on the silica layer surface in the optical waveguide substrate and a Pyrex glass (a trademark of a low alkali borosilicate glass) as a raw material thereof.

In the case of using silicon as a raw material of the optical waveguide substrate, it is preferable to use a Pyrex glass as a raw material of the lid, or alternatively borosilicate glass may be used. In the case of using silica as a raw material of the optical waveguide substrate, on the other hand, the anodic bonding can be attained by preparing a lid using a silica glass as the similar raw material as that of the substrate and a Pyrex glass or another type of borosilicate glass on a surface of the raw material. It is advantageous to prepare the optical waveguide substrate and the lid from the similar raw material since no warp by temperature change occurs in the bonding surface between them, so that the anodic bonding with a high degree of reliability becomes possible.

In this embodiment a groove is previously formed in a surface of the optical waveguide substrate or a bonding surface of the lid so as to form a groove as a passage for the refractive index-matching liquid which connects to the outside through an opening defined by the substrate and the lid. Covering the groove of the crossing portion of optical waveguides with the lid results in sealing the groove perfectly except for the opening. Thus required amount of the refractive index-matching liquid can be introduced into the groove through the opening.

If there are two openings, one provided as an inlet of the liquid, while the other provided as an outlet thereof, then the liquid can be poured into the groove, smoothly.

If there is only one opening, the required amount of the refractive index-matching liquid can be poured into any groove by way of contacting the liquid onto the opening under a reduced pressure or by way of dipping the entire substrate into the refractive index-matching liquid followed by returning the pressure to atmospheric pressure.

According to the latter method, there is no need to individually control the amount of the liquid to be poured into each of the openings.

Prior to injecting the refractive index-matching liquid into the groove, a surface of the substrate may be subjected to an oil repellent treatment that uses a finishing agent such as a silane coupling agent to smooth the way to remove excess amount of the refractive index-matching liquid coated on the substrate's surface after the injection thereof into the groove, thus allowing the more reliable sealing of the opening.

Furthermore, the process can be simplified by altering the sequence of steps: performing the step of processing the groove for optical switching prior to the step of depositing silicon for anodic bonding on a surface of the optical waveguide substrate.

An optical switch according to one embodiment of the present invention comprises crossing optical waveguides; a driving slit having a portion in which an optically transparent liquid with a refractive index approximate to that of the optical waveguide core and having the face of wall at the angle which satisfies the requirements for total reflection and optical axes of the optical waveguide cores at each of their crossing points; and a heater close to the driving slit. In this case, a width of a pouring slit communicated with the driving slit is narrower than a narrowest portion of the driving slit and preferably only one pouring slit is formed.

Consequently, the method of manufacturing an optical switch of the present invention is different from the conventional one in that the driving slit is covered with the lid at first. In spite of covering with the lid, the driving slit communicates with the outside through the pouring slit.

In the optical switch of the present invention, the pouring slit is formed by bonding an upper substrate or lid and the optical waveguide substrate together. The pouring slit is previously formed in the upper substrate so as to be positioned at the portion where a bypass is formed. The bypass connects to the both ends of the driving slit at the time of bonding the substrates together.

In the method of manufacturing an optical switch of the present invention, the volume of the refractive index-matching liquid to be poured into the driving slit can be regulated by various ways, for example, the following processes:

(1) the process that regulates the volume of the liquid to be poured into the driving slit formed on the optical waveguide substrate as described above by dipping an inlet of the pouring slit into the above liquid and standing it for a fixed period of time;

(2) the process that regulates the volume of the liquid to be poured into the driving slit with temperature, including the steps of dipping an inlet of the pouring slit into the above liquid and standing it for a fixed period of time at a predetermined temperature higher than a room temperature, and then resetting to the room temperature;

(3) the process that regulates the volume of the liquid to be poured into the driving slit with temperature, including the steps of keeping the condition at a predetermined temperature higher than a room temperature for a fixed period of time, dipping an inlet of the pouring slit into the above liquid, and then resetting to the room temperature;

(4) the process that regulates the volume of the liquid to be poured into the driving slit with pressure, including the steps of dipping an inlet of the pouring slit into the above liquid and standing it for a fixed period of time at a predetermined pressure lower than atmospheric pressure and then resetting the condition to atmospheric pressure;

(5) the process that regulates the volume of the liquid to be poured into the driving slit with temperature, including the steps of keeping the condition at a predetermined pressure lower than atmospheric pressure for a fixed period of time, dipping an inlet of the pouring slit into the above liquid, and then resetting the condition to the atmospheric pressure;

(6) the process that regulates the volume of the liquid to be poured into the driving slit with temperature by one of the above processes, further including the steps of applying a predetermined pressure after resetting the condition to room temperature or to the atmospheric pressure, and then releasing the pressure to reset the condition to the atmospheric pressure.

The conventional method in which the driving slit is covered with the lid after the injection of index-matching liquid has some problems on its reliability and manufacturability. For this reason, the present invention adopts a method including the steps of covering the driving slit with the lid and then pouring the liquid from the pouring slit that communicates with the driving slit.

In the optical switch of the present invention, the driving slit is limited in size, for example of less than 10 $\mu$m in width and 40 $\mu$m in depth. Therefore, a capillarity should be considered for pouring the refractive index-matching liquid. When the inlet of the pouring slit is dipped into the refractive index-matching liquid, the liquid enters into the slit and pushes a gas in the slit as far as it will go as a result of capillary attraction.

If a plurality of the pouring slits are formed, the gas pushed by the liquid escapes from an inlet of the other slit to the outside. In this case, there is no obstruction to block the liquid's entry or the liquid's path, so that the driving slit can be filled with the refractive index-matching liquid in a short time. It means that it is almost impossible to regulate the volume of the liquid to be poured. By the way, there is an idea of measuring the required volume of the liquid and putting the required volume of the liquid onto the inlet of the pouring slit to attain an objective condition in which a liquid column is preserved in a part of the driving slit. However, the above idea is not implementable because there is no method of measuring and dropping a very small volume of the liquid.

In the field of biotechnology or the like, a micro syringe, a micro pipette, and so on are used for regulating the micro volume of a liquid for cell fusion or the like. However, these devices cannot applied in the present purpose because each of them cannot handle the liquid's volume precisely less than the order of nano liters (nl).

In the case of the structure having only one pouring slit, the refractive index-matching liquid enters into the pouring slit and pushes the gas in the slit as a result of capillary attraction as described above when the inlet of the pouring slit is dipped into the liquid. In this case, however, there is no portion to release the gas to the outside, so that the gas is trapped in the slit. If a pressure of the trapped gas is brought into a state of equilibrium with a pressure of surface tension caused by the capillary attraction, the entry of the refractive index-matching liquid can be stopped. After attaining the equilibrium, however, the trapped gas's pressure is higher than a pressure of the outside of the slit (i.e., a pressure of the refractive index-matching liquid that enters into the slit), so that the solubility of the gas can be increased and dispersed into the refractive index-matching liquid, resulting in gradual release of the trapped gas to the outside. Consequently, the refractive index-matching liquid is poured into the pouring slit as much as the escaped volume. In this case, however, a rate of pouring the liquid is very small because the volume of the liquid dispersing into the refractive index-matching is very small. Therefore, the desired volume of the refractive index-matching liquid can be poured if the inlet of the pouring slit is closed by an adhesive at the time of completing the injection of the desired volume of the refractive index-matching liquid into the driving slit.

The above configuration of the optical switch will be described in detail with reference to FIG. 2.

Figure 2:
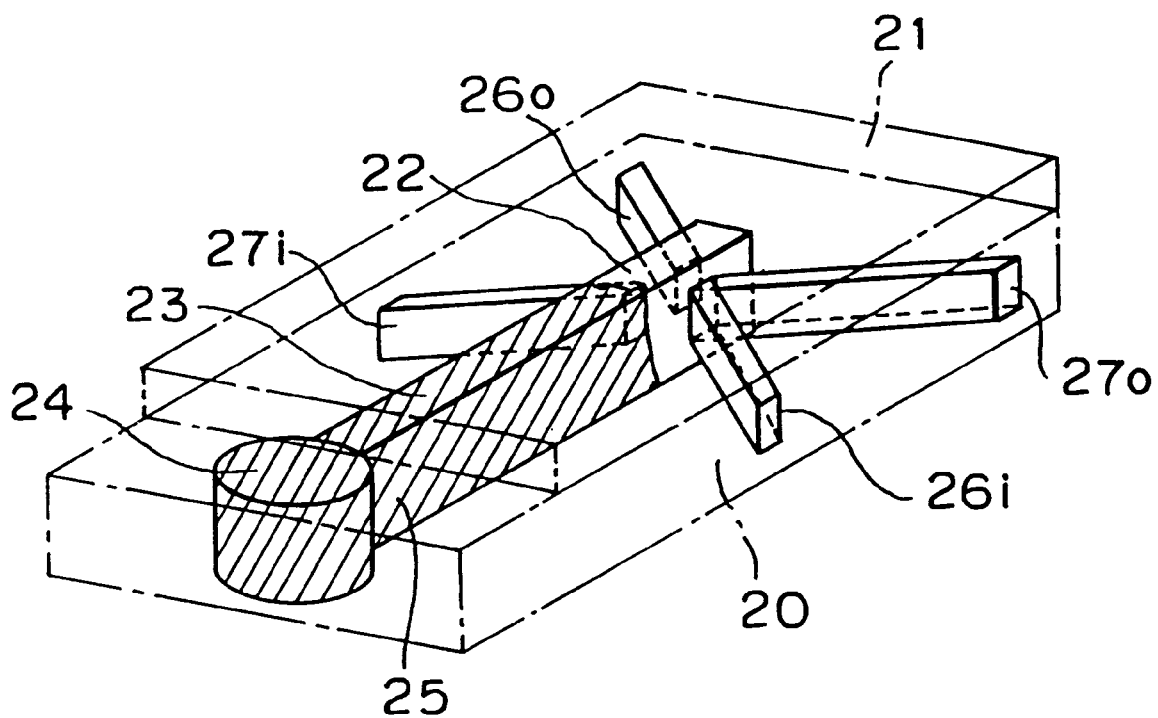
FIG. 2 is a schematic perspective view showing an optical switch for illustrating the action of the optical switch.

In FIG. 2, the reference numeral 20 denotes an optical waveguide substrate, 21 denotes an upper substrate, 22 denotes a driving slit, 23 denotes a pouring slit, 24 denotes an inlet of the pouring slit 23, 25 denotes a refractive index-matching liquid, and 26$i$, 26$o$, 27$i$, and 27$o$ denote optical waveguides, respectively.

As shown in FIG. 2, a cross-sectional area of the pouring slit 23 is very small. If the inlet 24 of the pouring slit 23 is dipped into the liquid 25, therefore, the equilibrium among an outside air pressure (Po), a pressure (Pa) of gas trapped in the pouring slit, and a pressure (Ps) of a surface tension between the liquid and the gas can be attained, while the liquid enters the pouring slit by an effect of surface tension until the above equilibrium is completed. The relation among the above pressures Po, Pa, and Ps is expressed by the following formula (1).

$$Po+Ps=Pa \tag{1}$$

The volume Va of the liquid to be poured at the time of attaining the above equilibrium is expressed by the following formula (2).

$$Va=(Po/Pa)v \tag{2}$$

(wherein V is the volume of the pouring slit and the driving slit)

For simplifying the explanation, FIG. 2 is prepared so that the pouring slit 23 and the driving slit 22 are illustrated as those having the same sized cross sections and arranged in line so as to draw their structures without a distinction. Hence, the volume of the liquid 25 to be poured is proportional to an injected length (i.e., a length of liquid column passing through the driving slit 22 or the pouring slit 23) whether of the driving slit 22 or of the pouring slit 23.

If the total length of the driving slit 22 and the pouring slit 23 is defined as L, by the action of a surface tension, a boundary surface of the liquid travels to a position $l_1$ expressed by the following equation (3)

$$l_1=\{Ps/(Ps+Po)\}L \tag{3}$$

Ps is a surface tension pressure and is expressed by equation (4) below $$Ps=2\sigma(1/d+1/w) \tag{4}$$

wherein d is a depth of the pouring slit and of driving slit, w is a width of the pouring slit, and of driving slit. The penetration of the refractive index-matching liquid is completed relatively quickly. In the case of a pouring slit having a cross section of several tens $\mu$m square and a length of several hundreds $\mu$m, it takes several tens seconds for completion.

However, the penetration of the refractive index-matching liquid does not stop but continues though more slowly than before. In the above-described equilibrium, the gas trapped in the slit is always at a pressure higher than atmospheric pressure by the surface tension pressure Ps. As a result, the trapped gas diffuses in the liquid and continues to be released to the outside so that its volume decreases continuously and a fresh liquid is injected in the same amount as the volume of the gas. Therefore, the length, $l_2$, of the liquid injected at the time t is expressed by the equation (5) below $$l_2=\{(\xi\sigma(1/d+1/w)t+l_1^2)\}^{-\frac{1}{2}} \tag{5}$$

wherein $\xi$ is an arbitrary constant defined by solubility and diffusivity of the above gas. The rate of pouring the liquid into the pouring slit having a cross sectional size of 10 $\mu$m×40 $\mu$m and a length of 100 $\mu$m is of the order of several ten pico-liters per hour (pl/hr). If the refractive index-matching liquid is a silicone oil (a surface tension of 20 dyne/cm and a kinematic viscosity of 50 cSt), the constant $\xi$ takes the value of about 7×10$^{-15}$ m$^4$/Ns.

Accordingly, the refractive index-matching liquid 25 is poured into the pouring slit 23 by the action of the surface tension and the dispersion, so that the volume of the liquid to be poured into the driving slit 22 can be regulated by the time.

The method of regulating the injection volume using the diffusion of gas is characterized by its controllability because of a slow liquid injection. Although, there is a disadvantage that it takes comparatively a long time to complete the injection. If 400 $\mu$m of the refractive index-matching liquid of 50 cSt in kinematic viscosity is poured into the slit of 10 $\mu$m in width, 40 $\mu$m in depth, and 500 $\mu$m in length, it will take about 1 hour to complete the injection. Considering the manufacturing property, there is a need to shorten the time.

There are two methods for shortening the time for pouring the liquid into the slit.

A first method comprises the steps of dipping an inlet of the pouring slit into the liquid at room temperature for a fixed period of time, maintaining a constant temperature higher than the room temperature, and resetting to the room temperature to inject the refractive index-matching liquid into the slit.

According to the first method, the gas trapped in the slit is expanded with increased temperature and is released to the outside to reduce the volume of the gas trapped in the slit.

A second method comprises the steps of dipping an inlet of the pouring slit into the liquid at atmospheric pressure, maintaining a constant pressure lower than the atmospheric pressure, and resetting to the atmospheric pressure to inject the refractive index-matching liquid into the slit. The second method has the same effect as that of the first one by decreasing the outside pressure under the atmospheric pressure.

Referring now to FIGS. 3A to 3G, the first method will be described in detail.

An inlet of a pouring slit is dipped into a refractive index-matching liquid at room temperature, and simultaneously a boundary surface of the liquid enters up to an injection length $l_1$ by the time an equilibrium condition is attained (see FIG. 3A).

Then, a gas trapped in the slit expands when an optical switch is subjected to the temperature $T_3$ ($T_3 > T_2 > T_1$) higher than a room temperature $T_1$ (see FIG. 3B). Thus, the boundary surface of the liquid goes back to the side of the pouring slit's inlet by the time an equilibrium condition among an outside air pressure (Po), a pressure (Pa) of gas trapped in the pouring slit, and a pressure (Ps) of a surface tension between the liquid and the gas can be attained (See FIG. 3C).

An injected length $l_3$ of the liquid is expressed by the following equation (6) when the equilibrium condition is attained.

$$l_3 = (1 - PoT_3/P_{T3}T_1)L \quad (6)$$

wherein $P_{T3}$ is a pressure of the trapped gas at the temperature ($T_3$) higher than a room temperature and is expressed by the equation (7).

$$P_{T3} = Po + 2\sigma_{T3}(1/d + 1/W) \quad (7)$$

wherein $\sigma_{T3}$ is a surface tension of the liquid at the temperature ($T_3$) higher than a room temperature. Thus, the injected length $l_3$ is expressed by the following equation (8) by incorporating the equation (7) into the equation (6).

$$l_3 = \{1 - PoT_3/[Po + 2\sigma_{T3}(1/d + 1/W)]T_1\}L \quad (8)$$

If there is no increment of the temperature, a boundary surface of the liquid stops in the slit and the gas cannot be released to the outside (see FIG. 3C). In this case, the liquid's boundary surface only returns to its previous position when the temperature is adjusted to a room temperature. For releasing the gas being trapped in the slit, therefore, the value of $l_3$ should satisfy the following inequality (9)

$$l_3 < 0 \quad (9)$$

There is the need for increasing the temperature so as to satisfy the following mathematical expression (10) derived from the above equations of (8) and (9).

$$_3 > [1 + 2\sigma_{T3}(1/d + 1/W)/Po]T_1 \quad (10)$$

If the temperature increases so as to satisfy the above condition, the gas trapped in the slit reaches the inlet of the pouring slit (see FIG. 3D).

The outside of the inlet is opened, so that a boundary surface of the liquid at the inlet is spatially released to cause an increase in a curvature radius as a significant reduction in the pressure of surface tension (see FIG. 3E). A buoyancy grows steadily larger in proportion to the grow of part that extends off the inlet, so that the extended part of the gas is separated from the trapped gas at the certain instant and then it is diffused into the liquid and released into the outside. When the extended part of the gas is separated from the trapped gas, the liquid enters into the pouring slit by an effect of surface tension (see FIG. 3F).

Resetting the temperature of the liquid to room temperature $T_1$, the gas shrinks while the liquid is further injected into the pouring slit, resulting in the pressure of gas Pa (see FIG. 3G).

During the period of increasing the temperature, expansion, release, and contraction of the gas repeat in cycles.

If the temperature is decreased to the room temperature T1 after reaching the equilibrium condition, the trapped gas shrinks to a volume from which the volume of the gas released into the outside is subtracted and then an equivalent volume of the liquid is poured into the pouring slit.

As described above, it is possible to regulate the injection volume of the liquid by controlling the temperature. The time required for stabilizing to an equilibrium condition by increasing the temperature is about several minutes at 80° C. for the injection of 400 µm liquid into the pouring slit of 10 µm in width, 40 µm in depth, and 500 µm in length. Therefore, the time required for the liquid injection can be cut to a quarter of the time required for the liquid injection using gas diffusion.

In the case of the second method described before, the time required for the liquid injection can be also reduced because the same effects as that obtained by the method using a change in temperature can be obtained by the method in which a pressure of the outside of the slit is reduced to less than atmospheric pressure.

Each of the above liquid-pouring methods has the step sequence of dipping an inlet of the pouring slit at room temperature or at atmospheric pressure and then applying heat or reduced pressure to the optical switch. In this sequence, there is an advantage of simply performing the step of dipping the slit's inlet at room temperature or at atmospheric pressure. As described above, however, an injection of the liquid begins immediately after dipping the inlet into the liquid as an effect of capillarity pressure, so that there is the need to overcome the capillarity pressure at the time of removing the gas in the slit by means of heating or pressurizing. The volume of gas to be removed is not always constant because of dimensional deviation or distortion of the finished driving and pouring slits. If a slightly narrowed portion is in the pouring slit, there is the need for applying a greater pressure difference to remove the gas across that portion. Thus it is very difficult to remove the desired volume of the gas. In the case of constructing a matrix switch by arranging a plurality of optical switches, the optical switches should be simultaneously assembled. In addition, the same volume of the liquid must be poured into their driving slits, respectively. In the above methods, however, it is very difficult to inject the liquid evenly into a plurality of the slits.

To avoid such disadvantage, it is preferable to adopt a method including the steps of previously heating or pressurizing to decrease the volume of inner gas, and contacting an inlet of the pouring slit with the liquid under the previously heated or pressurized condition. For this purpose, a measure must be taken to have the inlet of the pouring slit dipped in the liquid while heating or at a reduced pressure. In spite of the additional step being required, this is an effective method for injecting the liquid uniformly to the driving slit.

Figure 10:
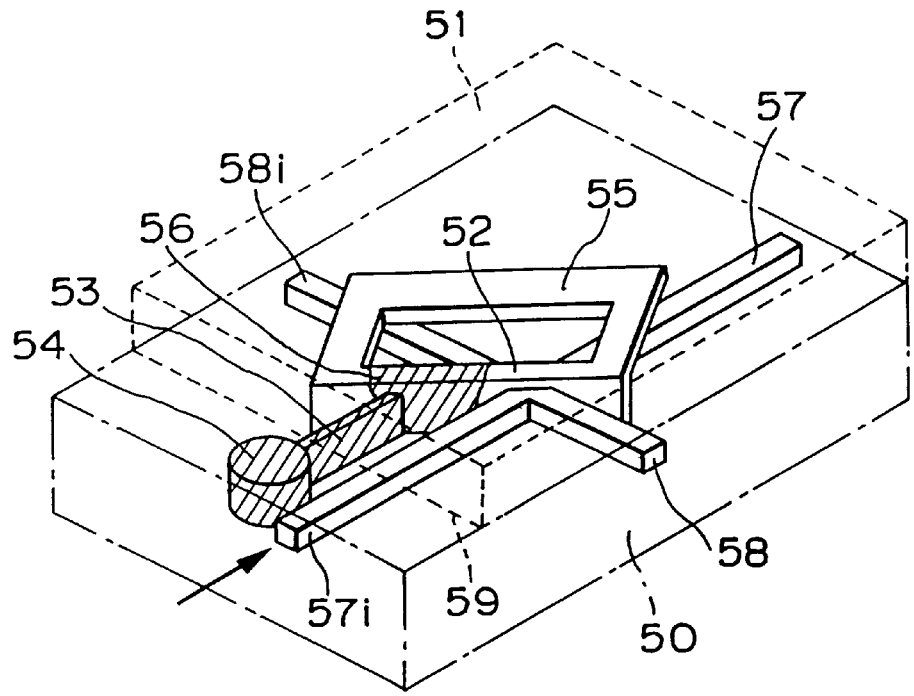
FIG. 10 is a schematic perspective view showing an optical switch according to a fourth embodiment of the present invention.

It is possible to inject the required volume of the liquid into the slit having a substantial configuration as shown in FIG. 10 to be explained in the section of Examples. For pouring the liquid into a driving slit of the optical switch of the present invention, an simple injection of the prescribed volume of the liquid is not good enough. It is also required that a liquid column having a desired length (a mass of a liquid spreading in full cross section of the slit and extending in a finite length) is formed in the driving slit. In some rare cases, the liquid column is generated at the stage of just after pouring the required volume of the liquid. In most cases, however, it is not generated. Therefore, the following procedure including the step of pouring the extra volume of the liquid.

If the liquid enters into the inside of the slit by the above injection method, inner walls of the driving and pouring slits becomes wet and the liquid is accumulated in the corners of the cross section of the slit because a high wettability of the refractive index-matching liquid comprising silicone oil as a raw material thereof with respect to a glass of the substrate.

If the liquid is further injected into the slit, the liquid is accumulated in the sectional corner and thus a liquid column is formed in the most narrow portion of the driving slit. At this time, a curvature radius of the liquid's boundary surface becomes small to reduce the volume of the liquid to be accumulated in the sectional corners. The pressure difference between the liquid and the trapped gas depends on the curvature radius. The smaller the curvature radius, the trapped gas is pressurized more. Growth of the liquid column is accelerated by adding the extra volume of the liquid on the liquid column in the driving slit as a result of overlapping a phenomenon in which the volume of the liquid to be accumulated in the cross-sectional corners is decreased and a phenomenon in which a pressure of the gas is increased. In most cases, the total volume of the liquid in the slit including the extra one exceeds the required volume thereof, resulting in the condition of supplying excessive liquid.

For completing the liquid column in a desired length, the step of heating or the step of decompressing the outside under the condition of supplying excessive liquid to increase the volume of the gas being trapped in the slit and release the excessive liquid through the pouring slit. In this case, it is required that a width of the pouring slit is smaller than that of the driving slit. As described above, the pressure difference between the trapped gas and the liquid is inversely proportional to the radius of the liquid's surface. If the width of the pouring slit is larger than that of the driving slit, the gas goes into the pouring slit without expelling the liquid because the pressure of the liquid column in the driving slit should be lower than the pressure of the liquid in the pouring slit when a boundary surface of the liquid enters into the pouring slit with the expansion of the gas. On the contrary, if the pouring slit's width is smaller than that of the driving slit, the liquid of the liquid column is excluded as the gas expands because the pressure of the liquid column in the driving slit is higher than the pressure of the liquid in the pouring slit even though a boundary surface of the liquid enters into the pouring slit. Consequently, the condition in which the pouring slit's width is smaller than that of the driving slit is a very important design criterion for regulating the volume of the liquid. The regulation of the liquid's volume requires the sealing of an inlet of the pouring slit under the condition of increasing the temperature or decreasing the pressure.

All of the methods described above leave the liquid injection to take place its own course. That is, the injection depends on a gaseous diffusion or on a removal of the inner gas by heating or decompressing. However, those methods using spontaneous liquid injection has the problem that it is very difficult to inject the liquid into a plurality of driving slits because of the following phenomenon.

Once the pressure of the gas being trapped in the slit has increased by generating a liquid column, the amount of dissolved gas in a refractive index-matching liquid (hereinafter, also referred to as an oil) is increased and then the gas starts to leak out to the outside as a result of diffusion of the gas through the oil at a speed faster than the speed of diffusion prior to the generation of the liquid column. Therefore, if the liquid column is generated at first, the oil is poured into the slit at a speed faster than the speed of diffusion prior to the generation of the liquid column. In other words, a positive feedback works in which the injection volume of the oil is increased as the oil is provided into the driving slit prior to the generation of the liquid column. Each of the slits has different timing of generating the liquid column because there are variations in manufacturing part size, so that the natural liquid injection hardly makes the volume of the liquid uniform. In addition, the natural liquid injection leads to an excess volume of the liquid at the stage of generating the liquid column in the driving slit almost without exception, resulting in the inconvenience of regulating the volume of the liquid.

To solve this problem, a pressure is applied temporarily and then the pressure is reduced to the atmospheric pressure. This makes it possible to inject the liquid evenly into a plurality of driving slits, which has been hardly realized by the injection method in which the pressure is decreased and then returned to the atmospheric pressure and the method in which the temperature is elevated by heating and then decreased to a room temperature.

Hereinafter, description will be made of a model for the behavior of the refractive index-matching liquid in accordance with the method of pouring the liquid of the present invention. The structure of an optical switch that requires the liquid injection is illustrated in FIG. 4.

At first, an optical switch is designed and fabricated in advance so that the volumes of the pouring slit and driving slit can be optimized such that the optical switch can reach an equilibrium with a necessary amount of the liquid accumulates in the driving slit when the pressure is finally returned to the atmospheric pressure.

More specifically, an optical switch structure having the configuration of a driving slit 5 and an injection slit 7 will be explained. In FIG. 4, the reference numeral 1 denotes an optical waveguide substrate, 2 denotes an optical waveguide layer, 3 denotes an optical waveguide, 4 denotes an upper lid, 5 denotes a driving slit, 6 denotes a bypass slit, 7 denotes an injection slit, 8 denotes an inlet of the injection slit 7, 9 denotes a heater, and 10 denotes a refractive index-matching liquid (oil).

Figure 4:
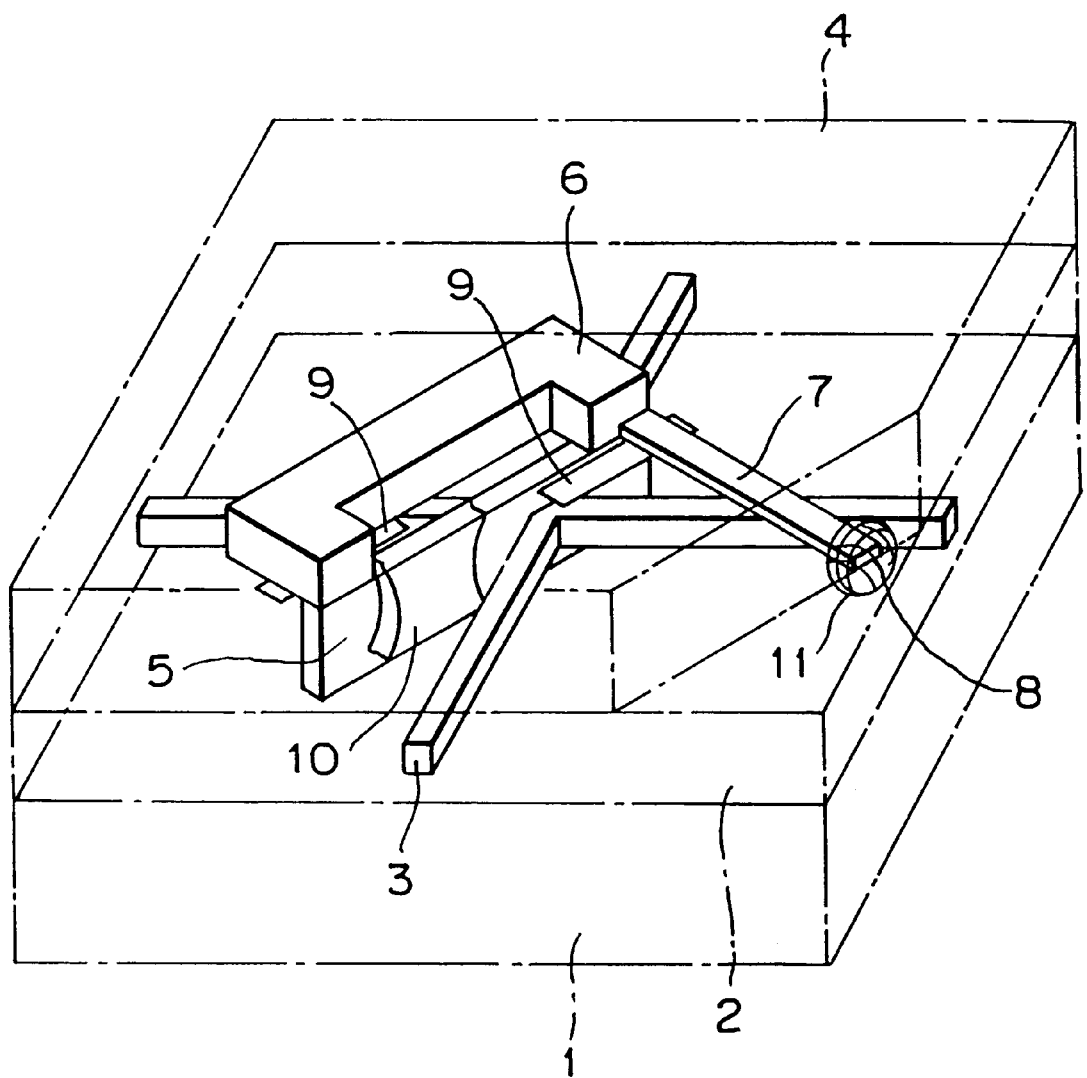
FIG. 4 is a perspective view showing an optical switch structure according to an embodiment of the present invention.

In the optical switch structure of FIG. 4, V denotes a total volume as the sum of a volume Vs of the driving slit 5 (including a volume of the bypass slit 6) and a volume Vi of the injection slit 7, v denotes a volume of a liquid column of the oil 10 which is eventually trapped in the driving slit 5, and w and d denote a width and a depth of the driving slit 5, respectively. A pressure p of the air trapped in the slit establishes the relationship with a surface tension γ of the oil 10 as expressed in the following equations (11) and (12) under the condition that the liquid column is eventually completed.

$$p-Po=2\gamma(1/w+1/d) \tag{11}$$

$$p(Vs-v)=Po\ V \tag{12}$$

wherein Po is an atmospheric pressure.

The equation (12) is based on the hypothesis that the injection slit 7 is filled with the oil 10. Thus, the volume of the gas can be expressed by: Vs−V.

Structures of the driving slit 5 and the injection slit 7 shown in FIG. 4 will he explained on the assumption that these structures satisfy the equations (11) and (12).

The width of the pouring slit 7 is formed so as to be smaller than the minimum width of the driving slit 5 for preventing the flow of part of the liquid from the injection slit filled with the liquid into the liquid column when the column is generated in the driving slit 5. If the boundary surface of the oil 10 is positioned at a certain point of the injection slit 7, a curvature radius of the boundary surface must be smaller than that of the liquid column generated in the driving slit 5. Otherwise, the volume of the liquid column cannot be regulated because the liquid flows from the pouring slit 7 into the liquid column as a result of the difference in pressures.

By contacting the oil to an inlet of the pouring slit 7, the oil goes into the inlet, and simultaneously the air in the pouring slit 7 is trapped and then compressed by the introduced oil 10. The injection of the oil 10 is stopped for a time when the boundary surface of the oil 10 reaches the boundary portion between the driving slit 5 and the pouring slit 7. The reason is that the narrow pouring slit 7 is widened and the curvature radius of the oil's boundary surface is increased in that place and thus the oil 10 cannot compress the air anymore and cannot go forward.

In the injection methods described above, the switch is held therein under the above condition until the air gradually escapes to the outside, or is subjected to decompression or heat to forcefully release the internal air to the outside and then the oil 10 is poured into the pouring slit 7. However, these methods cannot inject the liquid evenly into a plurality of slits as explained in the above description.

In the present embodiment, on the other hand, the oil 10 receives a pressure from the outside in a state that the oil movement is being stopped for a time. As a consequence, the trapped air is compressed while the oil 10 enters into the driving slit 5. The timing of forming a liquid column in the driving slit 5 is varied because of the variations in the groove's depth and width, and also imperfect processing. In this case, in the case of having a plurality of slits, the liquid columns can be generated in all the slits by forcefully pouring the excess oil 10 into the driving slit 5. After that, the pressure applied from the outside is decompressed to an atmospheric pressure. Then, the pressure of trapped air becomes a pressure in a final state, i.e., a pressure p expressed by the equation (11). The driving slit holds the liquid with the volume corresponding to that of the equation (12), while the excessive volume of the oil 10 is released from the injection slit 7 to the outside. Consequently, the desired liquid injection is completed. In this case, furthermore, it is important that a width of the pouring slit 7 is narrower than the minimum width of the driving slit 5 having the liquid column. If their widths are reversed, the oil 10 in the pouring slit 7 is eliminated while the oil 10 in the driving slit 5 is not eliminated at the time of removing an excessive oil to the outside by the pressure of the inner gas. There is a necessity to fill the pouring slits 7 with the oil 10 at all times, so that a width of the pouring slit 7 should be narrower than that of the driving slit 5.

A contacted area between the oil 10 and the air in a state that the liquid column is once formed is smaller than that in a state that the oil 10 remains in the corners of the driving slit 5. This is the reason why the liquid column in the driving slit 5 does not disappear when excess part of oil 10 is removed.

In the state where the pressure is reduced to the atmospheric pressure, there is a required volume of the completed liquid column is in the driving slit 5. Therefore, the liquid column can be completely packed in the driving slit 5 by covering with a seal material 11 such as an adhesive agent after removing excess part of oil 10 around the inlet 8 of the pouring slit 7 by wiping or the like.

In the above description, the optical switch structure is designed with consideration given to the volume of each slit so as to complete tasks under the condition of an atmospheric pressure and a room temperature. As a matter of course, however, it is also possible to combine with the method described above in which the volume of the trapped gas is regulated by pressure reduction or heat.

In the above description, the method for pouring a refractive index-matching liquid into a driving slit through a pouring slit is described. In the present invention, therefore, a sealed slit is formed prior to injecting the liquid into the slit.

According to the method of the present invention, two separate substrates are bonded together by means of anodic bonding without using any adhesive. The anodic bonding is of applying a voltage between two substrates to form intermolecular bond by an effect of electrostatic force. In this case, an adhesive agent is substantially not used and thus there is no need to worry about deterioration or the like to be caused by contacting the adhesive and the refractive index-matching liquid and about adversary effects on the adhesive reliability or the like. In this invention, the adhesive is used for sealing the inlet of the pouring slit. However, a cross sectional area of the inlet is very small while the length of the pouring slit is comparatively long, so that there is no effect on the refractive index-matching liquid in the driving slit.

EMBODIMENTS

Hereinafter, embodiments of the present invention will be described in detail with reference to the drawings.

Embodiment 1

Figure 5:
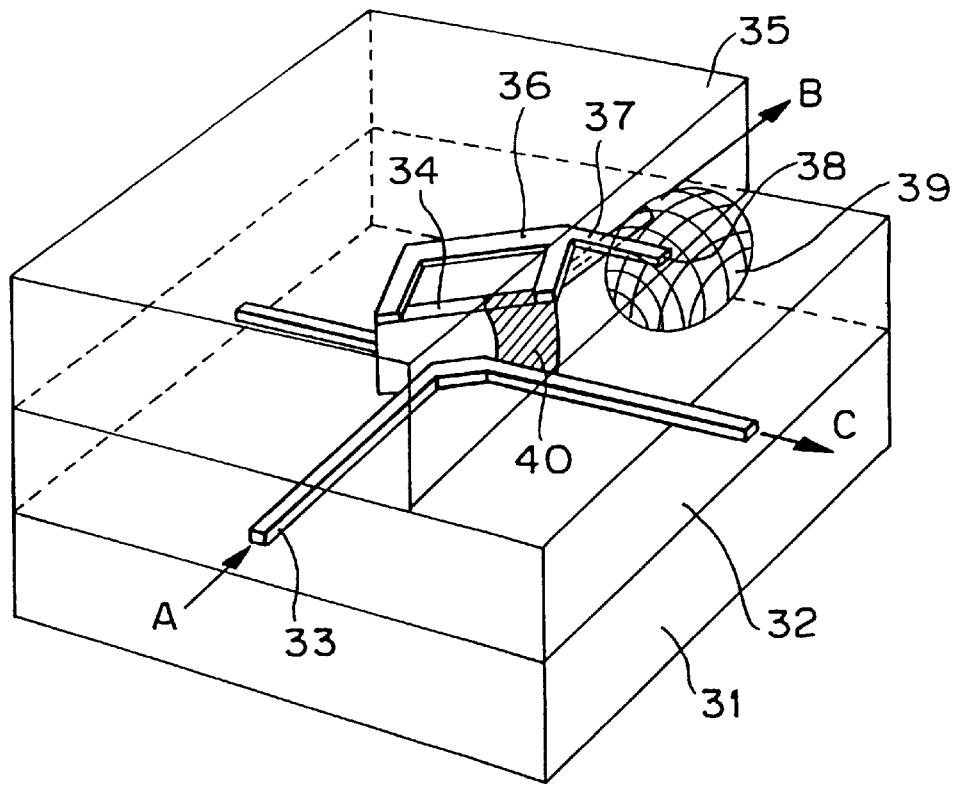
FIG. 5 is a perspective view showing an optical switch structure according to an embodiment of the present invention.

An optical switch structure as a first embodiment of the present invention is illustrated in FIG. 5. As shown in the figure, an optical waveguide layer 32 is deposited on a silicon substrate 31, and also optical waveguides 33 are imbedded in the optical waveguide layer 32.

Generally, the optical waveguide 33 is fabricated as follows.

First of all, a glass layer named as a bottom cladding layer is deposited on a silicon substrate 31. For depositing the glass layer, there can be used one of the methods including a flame hydrolysis deposition method, an ion beam evaporation method, and an electron beam source evaporation method.

Next, a core layer doped with a dopant'such as germanium is deposited on the bottom cladding layer. In general, a ratio of the difference between their refractive indexes is about 0.3%. The core layer is removed by means of photolithography technique, except for the required part to prepare a waveguide structure. Generally, a cross sectional dimension of the optical waveguide is 7 to 8 μm square. This parameter is also related to the refractive index, so that such dimension is defined so as to match the mode field of the guiding light in an optical fiber.

Furthermore, an embedded type optical waveguide is completed by forming an upper cladding layer by depositing a glass layer on the waveguide cores.

In the present embodiment, as shown in the figure, there two optical wave guides 33 provided as a pair of linear waveguides that cross each other in the optical waveguide layer 32.

At the intersection (the crossing point) of the two linear waveguides, moreover, a slit 34 is formed by means of photolithography technique. The slit 34 is etched from a top surface of the optical waveguide layer 32 so as to make a bottom of the slit 34 extend to the bottom cladding layer but the silicon substrate 31 in consideration of an extent of the mode field.

If a wall surface (in the side of arrow A in the figure) of the slit 34 acts as a mirror, for exchanging light between the optical waveguides 33 at the crossing point, the wall surface is positioned at the same angles to both optical waveguides 33. Furthermore, this slit's wall surface is perpendicular to planes in the optical waveguides 33.

The volume of a refractive index-matching, liquid 40 in the slit 34 is almost a half of that of the slit encapsulated. The refractive index-matching liquid has the same refractive index as that of the core portion. In this embodiment, a predetermined volume of silicone oil is provided as the refractive index-matching liquid 40 filled in the slit 34.

If the refractive index-matching liquid 40 is located at a portion of the slit 34 corresponding to the crossing point of the optical waveguides 33, an optical signal introduced from the direction of arrow A in the figure into one optical waveguide 33 crosses over the slit 34 to travel in a straight line in the direction of arrow B in the figure.

On the other hand, if the refractive index-matching liquid 40 is not located at a portion of the slit 34 corresponding to the crossing point of the optical waveguides 33, an optical signal introduced from the direction of arrow A into one optical waveguide 33 is perfectly reflected on the wall surface of the slit 34 and guided toward the direction of arrow C in the figure.

In this description, examples of guiding the optical signals are from the direction A to the direction B and from the direction A to the direction C, respectively. As the characteristics of light, the optical signals can be guided bidirectionally at the same time, from the direction B to the direction A and from the direction C to the direction A, respectively.

A half of the length of the slit 34 is enough to cover an optical field that transmits through the optical waveguide 33. The extent of the optical field is on the order of 10 μm from the middle of the optical waveguide core. Thus, the whole slit is about 40 μm in depth if the cladding layer has a thickness of about 20 μm.

Figure 6:
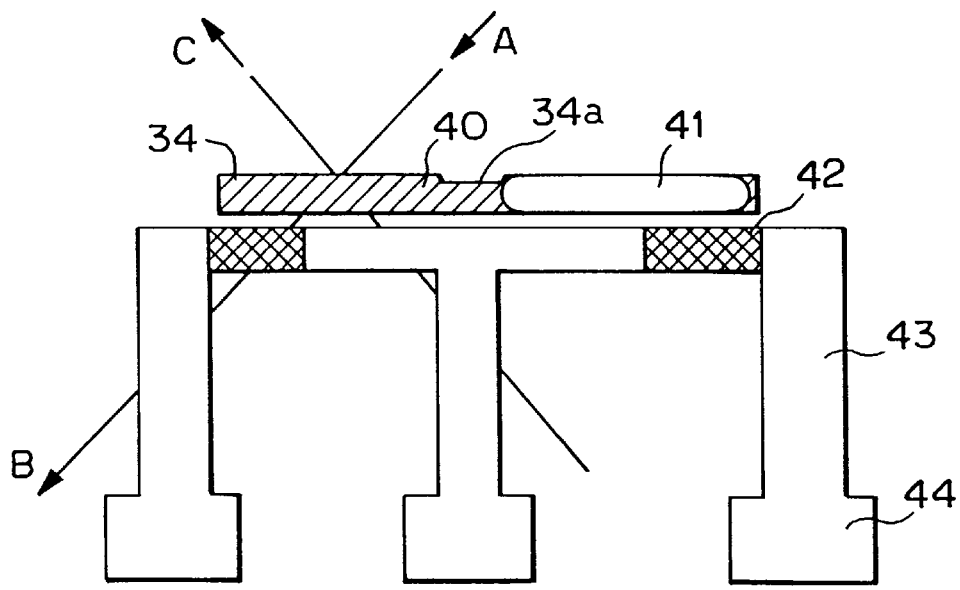
FIG. 6 is a schematic cross sectional view illustrating the positioning relationship between a slit and heaters in the optical switch according to an embodiments of the present invention.

FIG. 6 illustrates the relationship between the positions of the slit 34 and heaters 42 formed around the both ends of the slit 34 Using the technique of photolithography, the heater 42 is formed by depositing a metal of comparatively high resistance such as titanium and chromium on the optical waveguide layer 32.

Furthermore, a heater circuit 43 is also formed by depositing a metal film on the optical waveguide layer 32. In FIG. 5, however, the heaters 42 and its circuit 43 are omitted for simplified illustration.

As shown in FIG. 6, the volume of a retractive index-matching liquid 40 in the slit 34 is almost a half of that of the slit. For minimizing the area of contact with gas to keep a stable state of the liquid 40, the liquid 40 must be arranged so as to be leaning to one side of the slit 34. It is noted that the liquid 40 never fills a lower part of the slit 34 by an effect of gravitation.

This kind of the phenomenon is due to the fact that the surface tension becomes predominant by orders of magnitude compared with the gravitation because a width of the slit is on the order of several Lens μm.

As described below, the refractive index-matching liquid 40 in the slit 34 moves when the heater 42 is energized.

If the refractive index-matching liquid 40 is positioned in the left half of the slit 34, an air bubble (gas) is positioned in the right side.

Under this condition, a temperature of the left side of the heater 42 is increased to generate a gradient of temperature in the slit 34 when the left side of the heater 42 is energized. It is noted that a gradient of temperature is also generated on a surface of the air bubble 41. A surface tension of the interface between the refractive index-matching liquid 40 and the air bubble 41, i.e., the bubble's surface, is decreased with increasing temperature.

Therefore, a gradient of surface tension on the bubble's surface is generated and then the liquid on the bubble's surface moves toward the side of lower temperature. As a result, the bubble 41 moves toward the side of higher temperature, and finally the refractive index-matching liquid moves toward the right end portion of the slit 34 while the bubble 41 moves toward the left end portion of the slit 34. Comparing with the initial state, the liquid 40 changes positions with the air bubble 41. The replacement can be completed in several seconds or less with respect to the dimension of the present embodiment.

Furthermore, as shown in FIG. 6, the middle portion 34a of the slit 34 is formed as a narrowest portion thereof. Therefore, the air bubble 41 moved temporarily to the right or the left cannot across the narrowed middle portion 34a of the slit 34.

As a matter of course, the middle portion 34a of the slit 34 is formed so as to correspond to the variations in the slit width to some extent without preventing the movement of the bubble 41 by the gradient of a temperature.

In the present embodiment, the heaters 42 are provided on both sides of the slit 34, respectively, for the application of heat on the slit 34. An additional heater may be formed around the middle of the slit 34 to shift the heating positions one after another, resulting that a movement speed of the liquid 40 can be increased.

Furthermore, the slit 34 is covered with a lid substrate 35. For ensuring reliability, it is preferable that the lid substrate 35 is made of a raw material with an expansion coefficient approximate to that of the optical waveguide substrate.

In the present embodiment, a silicon substrate 31 is used as the optical waveguide substrate, so that Pyrex glass is used as the lid substrate 35. The lid substrate 35 may be made of the same material as that of the substrate 31. In this case, however, an extra arrangement such as an infrared microscope is required because the silicon cannot guide visual light and an infrared observation is required to check alignment to make sure the lid is in the right place.

The Pyrex glass is optically transparent to visual light, so that it has the advantage of smoothing the way to confirm the positioning of the lid using the ordinary microscope, the sealing condition of the lid, the situation of pouring the refractive index-matching liquid, and so on.

In the lid substrate 35, a bypass 36 and a pouring slit 37 are formed by means of photolithography. As shown in FIG. 5, the bypass 36 and the pouring slit 37 is formed in a bottom surface of the lid substrate 35, as part of a contact surface thereof to be contacted to an upper surface of the optical waveguide substrate.

The bypass 36 is able to connect to an upper portion of the slit 34 on the side of the optical waveguide when the lid crosses the slit 34. That is, both ends of the bypass 36 connect to a surface of the optical waveguide substrate in one plane, so that it is provided as a bypass of the liquid 40 (or the bubble 41) when the bubble 41 (or the liquid 40) moves in the slit 34.

The pouring slit 37 extends to an end of the lid. If the pouring slit 37 is in a state of being crossed by the lid, then an inlet 38 that communicates to the slit 37 is opened to the outside at the end of the lid.

Figure 7:
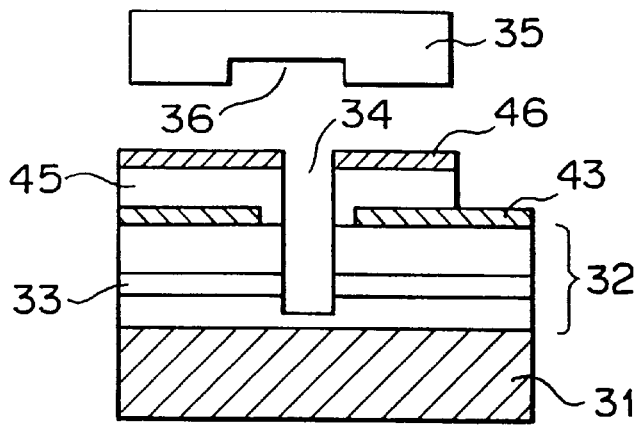
FIG. 7 is a cross sectional view showing a cross sectioned structure of an optical waveguide substrate and a cross sectioned structure of a lid substrate of the optical switch according to a first embodiment of the present invention.

In this embodiment, the anodic bonding shown in FIG. 7 is used as a method of bonding the lid substrate 35 with the optical waveguide substrate. In FIG. 7, a cross sectional view of the optical waveguide substrate and the lid substrate.

As shown in FIG. 7, an insulating layer 45 and a contact layer 46 are formed on a metal circuit layer in that order, except on output ports 44 of the electrode. The insulating layer 45 is made of glass, while the contact layer 46 is made of silicon. In addition, the metal layer includes the heaters 42 and the heater circuit 43.

The contact layer 46 may be any of amorphous, polycrystal, and monocrystal thin films. In this embodiment, however, an amorphous silicon thin film is used.

The Pyrex glass as the lid substrate 35 is carefully placed on the contact layer 46 in proper alignment with each other. The contact surfaces must be evened so as to be provided as a mirror-polished surface.

As the heater circuit 43 is formed, there is a possibility that uneven highs are formed on the surface. If the uneven highs are formed, therefore, the silicon contact layer 46 may be polished prior to the step of the anodic bonding. Alternatively, the glass insulating layer 45 may be thickened and then the glass insulating layer 45 may be polished prior to the step of depositing the silicon contact layer 46.

The composite structure is then subjected to a direct-current voltage by connecting a positive pole to a surface of the contact layer 46 made of amorphous silicon and connecting a negative pole to the lid substrate 35 made of Pyrex grass. In this example, these two separate substrates are joined together at a temperature of 450° C. and an electric voltage of 900 V.

The anodic bonding does not use any adhesive, so that there is no need to worry about a deleterious effect on the fine structural elements such as the slit 34. The anodic bonding brings one into intimate contact with the other and does not permit the passage of air, excellently.

Until now, the anodic bonding between the silicon substrate and the Pyrex glass substrate has been widely used. However, the connection is difficult when the glass layer of the order of several tens $\mu$m is provided as an insulating substrate on the surface, like the optical waveguide substrate.

In the present invention, the optical switch comprises not only the glass layer as the optical waveguide layer but also a micro structure consisting of the heaters 42, the heater circuit 43, and the insulating layer 45 made of the glass layer. Thus, the anodic bonding is impossible regardless of whether the substrate is silicon or not. However, it becomes possible to perform the anodic bonding by providing a silicon layer as the contact layer on its top surface.

After connecting the lid substrate 35, the refractive index-matching liquid 40 is poured from the inlet 38.

In the method, a pressure is calculated from the ratio between the total volume of the bypass 36 and the slit 34 and the volume of the liquid 40 to be poured. Then the refractive index-matching liquid is contacted to the inlet 38 in a space where the pressure is reduced to the calculated level. Furthermore, the pressure is further reduced to an atmospheric pressure.

The volume V of the liquid to be poured at a pressure of Po can be expressed by $V=V_1 (Po-P1)/Po$, wherein P1 is a gas pressure and $V_1$ is the volume in the slit 34 and the pouring slit 37 in a state of being compressed. On the other hand, the volume of remaining gas is $V_1-V$.

According to this method, there is no need to measure the volume of the liquid to be individually poured, and also no need to perform a detailed injection work. On the other hand, the injection can be performed by one operation, so that there is an advantage that the volume of the liquid to be poured can be adjusted with an increase in efficiency and reliability.

In the present embodiment, the refractive index-matching liquid is contacted to the inlet 38 under a reduced pressure. It is possible to obtain the same effects by contacting the liquid to the inlet 38 at atmospheric pressure prior to subject to a reduced pressure.

In this case, the liquid contacted to the inlet 38 is minimally introduced into the pouring slit 37 as an effect of capillarity. However, the pressure of the gas in both the slit 34 and the pouring slit 37 prevents further injection of the liquid. By reducing the pressure, the inside gas of the slit is released to the outside from the inlet 38. When left standing for a predetermined period, the inside pressure of the slit 34 becomes substantially equal to the reduced pressure of the outside.

It is presumed that the liquid is substantially poured as an effect of capillarity more than the injection volume thereof described above. However, a force to be generated by the capillarity (i.e., a capillarity pressure) can be negligible as compared with a pressure caused by compressing the gas because the inside pressure of the slit 34 finally recovers to an atmospheric pressure. Therefore, the regulation of liquid's volume is sufficiently attained by only considering the ratio of those pressures.

After pouring the refractive index-matching liquid 40 into the slit 34, an epoxy resin is applied over the inlet 38 and cured to form a sealing material 39 that seals the inlet 38.

Consequently, the communication between the liquid in the slit 34 and the outside is cut off, so that a stable liquid's volume and the quality of the liquid can be kept for a long time.

In the optical switch of the present example, the heater 42 is energized to move the liquid 40, accompanied by an increase of the pressure in the slit.

However, the area of the inlet 38 is very small such as on the order of several tens $\mu$m square, so that the pressure to be applied on the seal 39 is slightly increased, for example on the order of 10 mgf in spite that the inside pressure of the slit is increased on the order of 3 atm As a matter of fact, such high pressure cannot be attained because a vapor pressure of silicone oil to be used as the refractive index-matching liquid is extremely small and thus the increase in pressure is caused only by thermal expansion of the trapped gas. The adhesive strength between the adhesive and the glass is on the order of several MPa, so that it endures the rise in inside pressure by a bonding power of about 1 gf per 0.1 mm square of the bonding area.

A raw material of the seal 39 is not limited to epoxy resin. Silicone resin, silicone rubber, or the like may be used to obtain the same effects as that of obtained by using the epoxy resin.

During the step of sealing the inlet 38 with the seal 39, great care should be taken to see that the refractive index-matching liquid poured in the slit 34 is never attached to a bonding surface of the seal material. If not, the epoxy resin or the like cannot adhere with a sufficient strength.

In the present embodiment, as described above, a silicone oil is used as the refractive index-matching liquid. This liquid has an extremely high wettability to the glass provided as a raw material of the optical waveguide substrate and the lid substrate. Hence, the resin or the like is hardly adhered when the oil wets a surface of the glass. Before dropping the refractive index-matching solution, each surface of the optical waveguide substrate and the lid substrate is treated with a silane coupling agent to decrease the wettability of oil. The silane coupling agent may be a monomer comprising an organic group having amino radical, epoxy radical, vinyl radical, or the like on silicon and an alkoxyl group that chemically binds to a surface of the glass as a result of polymerization reaction and forms silanol radical by hydrolytic action.

Therefore, the silane coupling agent modifies a surface of the glass into a polar organic surface when it is applied on the glass. The silicone oil to be used as the refractive index-matching liquid is a non polar liquid, so that it shows good wettability with the non polar inorganic glass's surface but it shows poor wettability with a polar organic surface modified by the silane coupling agent.

As an indicator of expressing a degree of wetting between the liquid's surface and solid's surface, a wetting angle can be used. The wetting angle is the acute contact angle between a solid and a liquid surface such as the angle between the water surface in a capillary tube and the tube wall. In the case of the glass and the silicone oil, a modification by the silane coupling agent occurs, resulting in a wetting angle of 0 to 30 degrees. By modifying a surface of the glass substrate 31 prior to drop the oil droplets, it is possible to prevent a spread of wetted area over the surface. Thus, the remaining volume of the liquid at the time of pouring into the slit 34 can be removed by wiping off with a cloth or by sucking up into a pipette or the like.

Consequently, the resin provided as the seal 39 is bonded securely. In a few instances, however, this modification may lead to the decrease in an adhesive strength of the resin on the order of 1/10 with respect to that of non-modified one. In spite of such decrease, the obtained adhesive strength of the resin is enough to seal the slit.

The slit 34 positioned at the crossing point of the optical waveguides is formed by means of photolithography technique, for example it is formed by a reactive ion etching, plasma etching, or the like In this kind of the optical switch, the position of slit, verticality, flatness, and the like of the wall surface of the slit are very important factors for determining the optical characteristics of the optical switch.

In general, therefore, the step of forming the slit 34 is performed at the last of the process. That is, the slit is formed after completing the steps of wiring the heaters 42 and the like, depositing the insulating layer, and depositing the bonding layer 46 made of the silicon layer.

However, an etching speed of the bonding silicon and an etching speed of quartz glass of the insulating layer or the optical waveguide are substantially different from each other, so that it is very hard to etch them concurrently. It means that it is very hard to make the slit uniformly.

In the case that a plurality of slits is widely distributed over the surface, in particular, if the etching speed is very low, in-plane uniformity of a thickness of the silicon and in-plane uniformity of etching have a deleterious effect on in-plane uniformity of the slit formation.

To work around this problem, the slit is formed by etching the silica glass only when the slit formation is performed prior to the step of depositing the bonding silicon layer.

In addition, a silicon layer can be found in the slit when the bonding silicon is deposited after the formation of slit. However, the silicon being deposited on the wall surface of the slit has little effect on the optical characteristics because the silicon is transparent in the wave range of 1.3 $\mu$m to 1.65 $\mu$m (i.e., infrared region) that corresponds to the wavelength of optical signals to be used in communications.

Furthermore, a thickness of the silicon layer being deposited is on the order of several hundred nanometer at the bonding surface, while a thickness of the silicon being deposited on the slit's wall is a fraction of that of the silicon layer. Therefore, the changes in the position of slit's wall surface can be negligible. The wall surface of the slit has the shape of stripes on the surface, which are streaks formed on the 4wall surface by etching. Still more, the reflection loss at the time of switching is decreased by preventing a light scattering at the time of reflection as a result of smoothing uneven highs by depositing the silicon on the wall surface of the slit.

Embodiment 2

Figure 8:
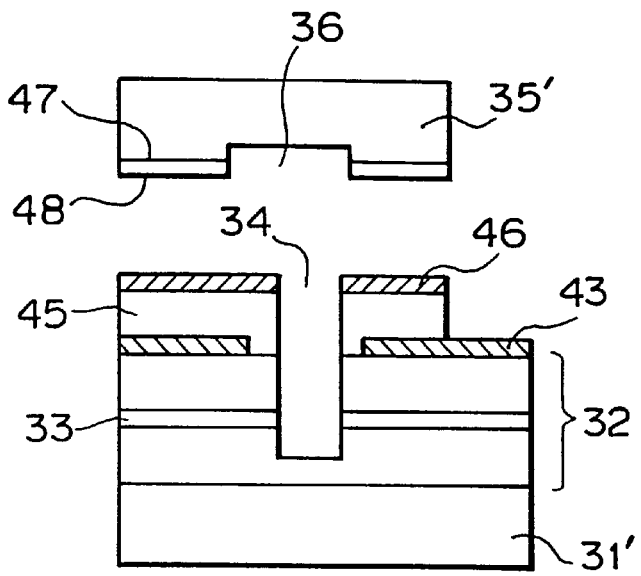
FIG. 8 is a cross sectional view showing a cross sectioned structure of an optical waveguide substrate and a cross sectioned structure of a lid substrate of the optical switch according to a second embodiment of the present invention.

FIG. 8 is a schematic view of the cross sectioned structures of an optical waveguide substrate and a lid substrate. The major difference to Embodiment 1 is to use a silica glass 31' substrate for the optical waveguide substrate, instead of the silicon substrate.

Comparing with silicon, the silica glass is the same material as that of the optical waveguide layer, so that an inside distortion is relatively very small after the formation of the optical waveguide layer. In addition, there is another advantage that a warp in the substrate and a polarization dependence are diminished.

Furthermore, the silica glass substrate is transparent enough to observe the inside of the slit from the back side of the optical waveguide substrate. This is an additional advantage of allowing the confirmation inspection with relative ease at the time of manufacture.

The deposition of the other layers on the side of optical waveguide substrate is the same as that of embodiment 1, except the follows.

If the silica glass is used on the side of optical waveguide structure, then Pyrex glass cannot be used as a lid because of the difference in their thermal expansion coefficients. Therefore, a silica glass 35' is used as a raw material of the lid.

However, the silica glass cannot be connected to the silicon by means of anodic bonding because the silicon glass does not contain any alkaline metal which is responsible to perform an electrical conduction at a temperature of the order of several hundred degrees in Celsius in the step of bonding.

In the present embodiment, therefore, a metallic layer of chromium is deposited on the silica glass, and then a Pyrex glass layer 48 is deposited on that layer. At the time of bonding, an anode electrode is contacted to the waveguide bonding silicon layer 46 and a cathode electrode is contacted to the lid Pyrex layer 48 for the application of voltage.

A comparison of the Pyrex layer 48 and the metallic layer 47 shows that an electrical A resistance of the metallic layer 47 is lower than that of the Pyrex layer 48. Thus, the metallic layer 47 becomes nearly at the voltage of negative electrode through the thin Pyrex layer 48 in spite of without directly contacting with the negative electrode. Furthermore, an anodic bonding can be completed by generating an electric field perpendicular to an interface between the Pyrex layer 48 and the silicon layer 46.

The lid-side Pyrex layer 48 points downward (in the case that the side of the optical waveguide substrate is in a downward direction) at the time of bonding, so that it is difficult contact with the negative electrode. In this case, however, the negative electrode can be connected to the silicon layer 46 by forming a part of the waveguide-side bonding silicon layer 46 so as to be electrically separated and so as to be contacted with the lid-side Pyrex layer 48, and also so as to expose a part thereof on which the negative electrode is contacted.

However, an electrode portion of the silicon layer 46 formed for the electrical contact never connects to the Pyrex layer 48.

Embodiment 3

Figure 9:
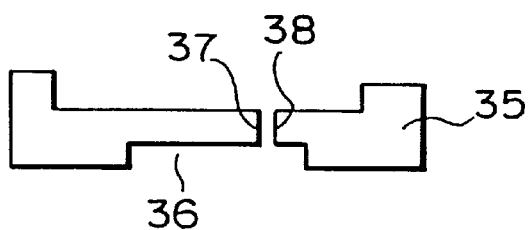
FIG. 9 is a cross sectional view showing a cross sectioned structure of a lid substrate of the optical switch according to a third embodiment of the present invention.

Referring now to FIG. 9, the third embodiments of the present invention will be described in detail. In FIG. 9, a cross-sectional configuration of the lid substrate.

In the first embodiment, an inlet for pouring the refractive index-matching liquid is formed as an opening at a side surface of the lid, and also a pouring slit is formed by etching a bonding surface side of the lid. In the present embodiment, on the other hand, the inlet is formed as an injection pore 38 which is opened perpendicularly through the lid.

As the present embodiment is configured in this manner, the position of pouring slit 37 does not occupy an area in a plane. Therefore, switches can be densely arranged. Particularly, it is effective to prepare a matrix switch in which a plurality of switches is positioned on respective grids.

Embodiment 4

A Basic Structure of an Optical Switch

FIG. 10 is a schematic perspective view that illustrates a basic structure of an optical switch as the fourth embodiment of the present invention. In the figure, the reference numeral 50 denotes an optical waveguide substrate, 51 denotes an upper substrate, 52 denotes a driving slit, 53 denotes a pouring slit, 54 denotes an inlet of the slit 53, 55 denotes a bypass slit, and 56 denotes a refractive index-matching liquid, and 57$i$, 57$o$, 58$i$, and 58$o$ denote optical waveguides, respectively.

An optical switch of the present embodiment comprises a plurality of optical waveguides, slits, and heaters (not shown). These structural elements are formed on the same optical waveguide substrate using a micro-machining technique, typically sputtering, photolithography, and dry-etching.

Among those structural elements, the optical waveguides 57$i$, 57$o$ and the optical waveguide 58$i$, 58$o$ are crossing each other in the optical waveguide substrate 50. On a crossing point of the optical waveguides, a driving slit 52 is formed. The driving slit 52 has a wall surface inclined at a predetermined angle with an optical axis of each optical waveguide to switch optical paths. A crossing angle of the optical waveguides and the driving slit satisfies a total reflection condition. In addition, a width of the driving slit is 10 $\mu$m, narrowing enough to decrease transmission loss. The driving slit has a depth thereof enough to block the light passing through the optical waveguide. Generally, a center of the optical-waveguide is positioned at 20 to 25 $\mu$m from the surface, so that it is processed so as to have on the order of 40 $\mu$m with the consideration of the extent of guided light. Furthermore, a side wall of slit is inclined at an angle of 0.5° or less in the vertical direction, and also a flatness (roughness) of 100 to 250 Å for the transmission/reflection. This configuration can be prepared by using RIE (reactive ion-etching).

In an optical switch of the present embodiment, only one pouring slit 53 is formed for the purpose of preventing the rapid flow of the liquid by the action of capillarity.

A size of the driving slit is 10 $\mu$m, 40 $\mu$m, and 100 $\mu$m, and its required index-matching liquid 36 is of several ten pico liters. For controlling an extremely small amount of the injection liquid a width of the pouring slit is narrower than that of the driving slit as described above. In this embodiment, the pouring slit is of 5 $\mu$m in width.

For sealing the inlet 54 of the pouring slit after pouring the liquid, there is the need for increasing a length of the pouring slit 53 so as to deteriorate the optical characteristics by the reaction between the refractive index-matching liquid 56 in the driving slit 52 and the adhesive. From this reason, the pouring slit 53 of the present embodiment is of about 2 mm in length.

A driving force of the sealed index-matching liquid is generated by decreasing a surface tension of the liquid by the application of heat by means of heater. In FIG. 10, for simplifying and avoiding complicated illustration, a heater and its circuit formed around the driving slit 52 are not shown. The heater is made of a thin film of Ti and Cr and arranged on a portion near the driving slit. The circuit is formed as an Au thin film.

In this embodiment, a bypass slit 55 is formed so as to never cross to the optical waveguides. Also, the bypass slit 55 is connected to both ends of driving slit 52 for making an easy movement of the refractive index-matching liquid 56 as shown in FIG. 10.

The bypass slit 55 is in the shape of a square-cornered, so that the refractive index-matching liquid 56 tends to stay in the corner. In addition, it is very difficult to estimate the volume of the liquid at the time of the injection. To avoid the stagnation of the refractive index-matching liquid in the corners of the bypass slit, the corners of the bypass slit 55 are curved so as to have a radius of curvature larger than the radius of curvature of a boundary surface of the refractive index-matching liquid, thus smoothing the way to introduce the liquid into the driving slit 52. It is noted that the same effect can be attained by rounding each corner of a square shaped cross section of the slit.

Embodiment 5

A Basic Structure of an Optical Switch

Figure 11:
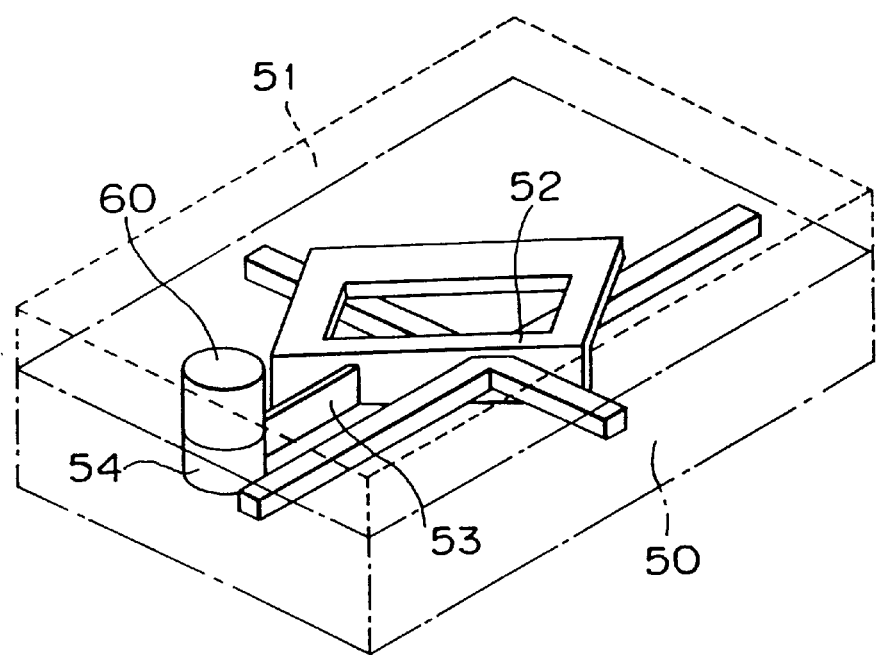
FIG. 11 is a schematic perspective view showing an optical switch according to a fifth embodiment of the present invention.

FIG. 11 is a schematic perspective view that illustrates an inlet of a pouring slit structure in an optical switch as the fifth embodiment of the present invention.

The driving slit 52, the pouring slit 53, and the bypass slit 55, which are shown in FIG. 10, are formed by fixing the upper substrate 51 and the optical waveguide substrate 50. Two substrates are fixed so as to never block an inlet of the pouring slit 53. Thus the driving slit 55 and the bypass slit 55 are aligned to ensure they are in the right place.

A "L"-shaped corner 59 in FIG. 10 is formed by arranging the position of a side surface of the upper substrate 51 and the optical waveguide substrate 50. The L-shaped corner 59 is connected with the pouring slit 53, so that the poured liquid escapes to the outside. Consequently, the escaped index-matching liquid 56 depresses the mechanical strength of adhesive when the inlet 54 of the pouring slit 53 is sealed.

A decrease in the mechanical strength of the adhesive leads to a deterioration of the reliability and the productivity of the optical switch. Thus the structure that never forms the "L" shape is required.

To solve this problem, the optical switch shown in FIG. 11 comprises a through hole 60 having the same radius as that of a inlet. The through hole 60 is aligned to the inlet 54 and covering the whole optical waveguide structure, solving the above problems. The through hole 60 is formed by dry-etching, sand blast, and ultrasonication.

Embodiment 6

A Structure of an Liquid Column

Figure 12:
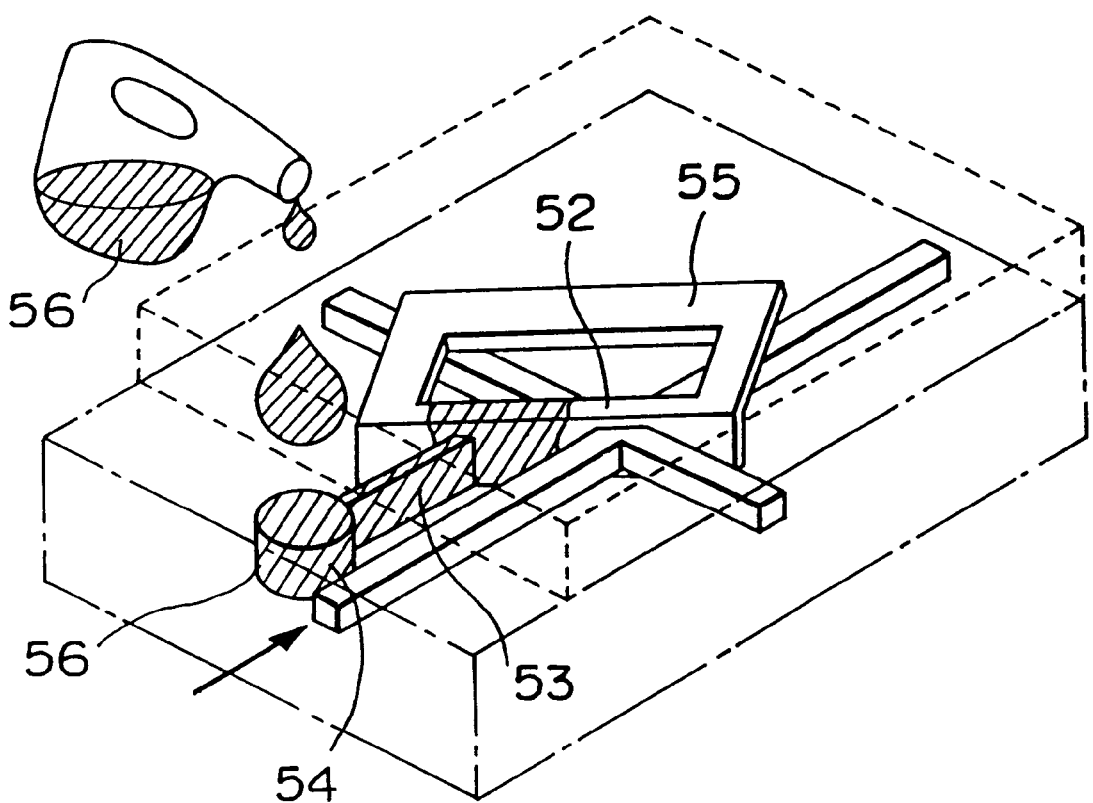
FIG. 12 is a schematic perspective view showing an optical switch according to a sixth embodiment of the present invention.

FIG. 12 is a schematic perspective view that, illustrates the way of how to introduce a refractive index-matching liquid into a driving slit.

The process of pouring a refractive index-matching liquid 56 into a driving slit 52 is performed after fixing an optical waveguide substrate 50 and an upper substrate 51.

As shown in FIG. 12, a single inlet 54 exposed to the outside of the substrate is dipped into the refractive index-matching liquid 56. Simultaneously, the liquid begins to move into the slit until an equilibrium state is completed by a surface tension of the liquid. The time required for completing the equilibrium state is several seconds if the slit is of 10 $\mu$m×40 $\mu$m in cross area and 100 $\mu$m in length. After completing the equilibrium state, the liquid is further progressed by the diffusion of trapped gas. The injection of liquid depends on the time, the injection rate is on the order of several tens pl/hr if the pouring slit is of 10 $\mu$m in width, 40 $\mu$m in depth, and 100 $\mu$m in length (see FIG. 13).

Therefore, the injection time is calculated by dividing the required volume of the liquid to be poured by an injected speed of the liquid to obtain a calculated prediction. When the time has passed from the time of dipping the inlet of the pouring slit to the time corresponding to the calculated time, the required amount of the liquid can be introduced into the driving slit 52. For example, in the case of pouring 400 $\mu$m of the refractive index-matching liquid with kinetic viscosity of 50 cSt into the slit having 10 $\mu$m in length, 40 $\mu$m in depth, and 500 $\mu$m in length, the injection can be completed by 3 hours.

The method that controls the injection volume by a lapse of time through the use of the diffusion of gas takes a comparatively long time, so that we will consider the following two methods for the purpose of shortening the time for increasing the productivity.

The first method is to control the injection volume by a temperature (see FIG. 14). The method comprises the steps of dipping an inlet of the pouring slit into the liquid, setting it aside until the poured liquid attains the equilibrium state, expanding the trapped gas by increasing the temperature, releasing the expanded gas to the outside to reduce the volume of the trapped gas, decreasing the temperature to a room temperature. Using this method, the injection of the liquid into the slit having the same dimension described above can be completed at about 80° C. and it takes on the order of several ten minutes.

Actually, the optical switch is placed on a heater to heat up to 80° C. after pouring the liquid until the equilibrium state is attained at room temperature. After the completion of heating to 80° C., then the heater is cooled down to a room temperature. If the driving slit 52 does not receive the required volume of the liquid at the time of attaining the state of equilibrium, then the temperature corresponding to the shortage is increased to release the gas 61 to regulate the volume of liquid. After attaining the equilibrium state at room temperature, an excess part of the liquid is wiped off the inlet 54 and then seal the inlet 54 with the adhesive.

In this embodiment, the adhesive may be any of epoxy resins or silicone rubbers. The time required for the injection and the sealing can be included in the time of regulating the temperature high or down, so that it takes on the order of several minutes.

The second method is to regulate to the injection volume of the liquid by means of the changes in pressure (see FIG. 15). That is, the method attains the expansion of the trapped gas 61 by decreasing the outside pressure of the optical switch instead of increasing the above temperature. The second method is also able to shorten the time to required.

Actually, the liquid is introduced into the slit at atmospheric pressure until the gas 61 is in the equilibrium state, followed by placing the optical switch into a decompression device to reduce the pressure. After attaining the equilibrium state at the decompressed atmosphere, the atmosphere is brought back to an atmospheric pressure. If the required volume of the liquid is not introduced into the driving slit when the equilibrium state is attained at atmospheric pressure, the injection volume can be regulated by releasing a part of the trapped gas 61 by decompressing the pressure corresponding to the amount of the shortage. After attaining the equilibrium state at atmospheric pressure, an excess volume of the liquid is wiped out from the inlet 54 of the pouring slit, followed by sealing the inlet 54 by applying an adhesive thereon.

In this method, therefore, the time required to perform the injection depends only on the time to be required to regulate the pressure, so that the time for the injection can be shortened by stabilizing the pressure in a short time.

In the manufacturing method described in the description of Embodiment 6, there is a possibility of causing the difficulty in that uniformly distribute aliquots of the liquid into a plurality of slits because of variations in part size due to the process of forming the slits. In the following embodiments, the method for solving such disadvantages will be described in detail.

Embodiment 7

Manufacturing a Liquid Column Driving Type Optical Switch.

FIG. 16 illustrates the procedure of the liquid-ejecting method according to Embodiment 7 of the present invention. A configuration of the optical switch for the liquid injection is the same one as that of shown in FIG. 4. The optical switch shown in FIG. 4 comprises a driving slit 5 formed on the optical waveguide, and a bypass slit 6 formed on a lid and connected with both ends of the driving slit 5, and a pouring slit 7 formed on the upper lid 4 so as to communicate from a side surface of an upper lid 4 to the diving slit 5. The upper lid 4 is prepared so as to have grooves formed by photolithography on a Pyrex glass, where the grooves are used as the bypass slit 6 and the pouring slit 7, respectively. The upper lid 4 is bonded to the upper side of the optical waveguide substrate in which the driving slit 5 is formed by photolithography. The bonding between them can be performed by anodic bonding. The driving slit 5 on the side of the optical waveguide substrate is of 5 $\mu$m in width, 40 $\mu$m in depth, and 200 $\mu$m in length, while the bypass slit 6 on the side of lid is of 40 $\mu$m in width, 20 $\mu$m in depth, and 400 $\mu$m in length. These dimensions are typical dimensional values of this kind of optical switch. It is also to be noted that a length of liquid column may correspond to about ⅓ length of the driving slit 5 because this size is ideal for the optical switch. Therefore, the volume (V) of the liquid column is V=1.3×10$^4$ $\mu$m$^3$, the volume (Vs) of the slit is Vs=4.0×10$^5$ $\mu$m$^3$. The oil 10 has a surface tension of 20 dyne/cm and hence the pressure of the air trapped is by about 9.0×10$^3$ Pa higher than atmospheric pressure according to the equation (11). Since 1 atm pressure equals to 760 mmHg=1.0×10$^5$ Pa (=1000 hPa), the inside pressure is by about $\frac{1}{10}$ higher than atmospheric pressure. A volume of the pouring slit 7 can be estimated by incorporating these values into the equation (12). We obtained the estimated value of $2.2 \times 10^4 \mu m^3$. If the size of $10 \mu m \times 5 \mu m$ is set for a cross section of the pouring slit 7, then the length thereof is $440 \mu m$. It is easy to make a groove of $10 \mu m$ in width and $5 \mu m$ in depth in a surface of the Pyrex substrate. In this embodiment, the pouring slit 7 is sized as described above.

The procedure of pouring the liquid into the slit will be explained below with reference to FIG. 16.

Figure 16A:
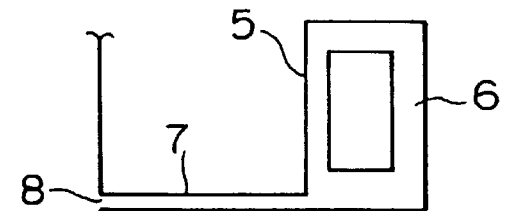
FIGS. 16A to 16F are schematic cross sectional views illustrating the procedure according to a seventh embodiment of the present invention.
Figure 16B:
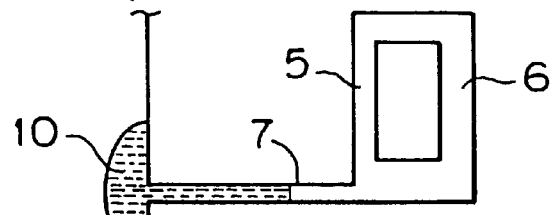
Figure 16C:
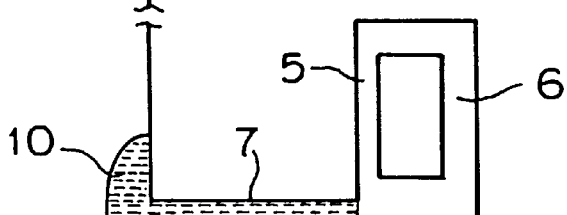
Figure 16D:
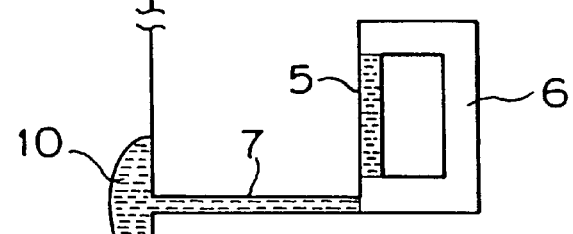
Figure 16E:
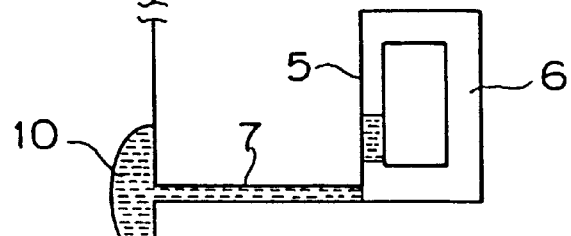
Figure 16F:
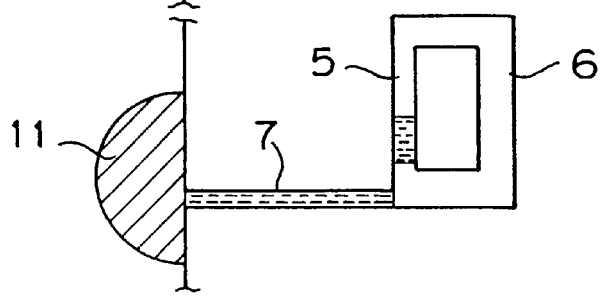

Prior to injecting oil 10 as a refractive index-matching agent, each of the pouring slit 7 and the driving slit 5 is in the state of empty (FIG. 16A). As described above, if the oil 10 is contacted to the pouring slit 7, the oil 10 moves into the pouring slit 7 by an effect of surface tension (FIG. 16B), and then the oil fills the pouring slit 7. If a top boundary surface of the oil 10 reaches to the driving slit 5, the movement of the oil is suspended (FIG. 16C). Applying excess 0.1 atm pressure from outside, the volume of the inside gas 39 is reduced with about $\frac{1}{10}$ of its volume. Thus, about $4.0 \times 10^4 \mu m^3$ part of the oil 10 is forcefully poured into the driving slit 5. This volume is about three holds of the volume of the liquid column. If this volume of the oil enters into the driving slit 5, a liquid column must be generated at a narrowed portion of the driving slit 5 (in this embodiment, a portion of $5 \mu m$ width) (see FIG. 16D). Therefore, the liquid column can be generated under such pressurizing condition in spite of the variations in the width of slit, surface condition, and so on within an accuracy of finishing. In this embodiment, everything is explained only for a single driving slit. It is needless to say that the number of the driving slit is not limited to one but also the present embodiment can be applied to an optical switch having a plurality of driving slits, or simultaneously applied to a plurality of optical switches to inject the oil. Shifting the pressure to an atmospheric level after the generation of the liquid column, the inside gas 39 releases an excess part of the oil 10 to the outside and holds the desired volume of the liquid column in the driving slit 5 at a state of pressure $9.0 \times 10^3$ Pa higher than an atmospheric pressure (FIG. 16E). In this state, the pressures reach an equilibrium. Then, an excess part of the oil 10 at an inlet of the pouring slit 7 is wiped off and the inlet is sealed with an epoxy resin adhesive. Consequently, the liquid injection and the sealing are completely finished (FIG. 16F).

As mentioned above, the present embodiment includes the step of contacting the inlet 8 of the pouring slit to the oil 10. This kind of contact may be performed by dropping a droplet of the oil 10 by a dropping pipette or the like in the present invention or by touching with a capillary glass or the like previously wetted with the oil 10. Of course, it is not limited to these techniques. Alternatively, for example, a substrate of the optical switch may be dipped into a bath of oil 10 to obtain the same effects as those of the above techniques. For the mass treatment, the latter technique will be more effective.

After completing the injection, an excess part of the oil 10 on the pouring slit's inlet 8 may be removed by another ways, for example the way of dipping the inlet 8 into alcohol for the washing, or the way of spraying alcohol or gust of air for flowing off.

In this embodiment, a seal material 11 for the seal is an epoxy resin adhesive but not limited to. A silicone rubber, a silicone resin, or the like may be used instead of the epoxy resin.

In the foregoing embodiment, the volume of the pouring slit 7 and the volume of the driving slit are adjusted so as to satisfy the equations (11) and (12). Therefore, the oil injection can be performed at atmospheric pressure during the period of starting the oil injection, and the required volume of liquid column can be automatically completed by recovering the pressure to an atmospheric one after the application of pressure.

Consequently, the liquid injection can be performed more easily when the slits are correctly sized and manufactured. When the volume of the pouring slit 7 is larger or smaller than the predetermined one, however, a liquid column can be formed in a stable manner by using the liquid injection method after the decompression or the pressurization prior to keep the oil in contact with the pouring slit 7. Alternatively, after the application of pressure, it is possible to complete the appropriate volume of liquid column by holding the pressure higher than an atmospheric pressure or holding the former less than the latter at the time of sealing the inlet with the epoxy resin or the like under a reduced pressure. Accordingly, the conventional decompression or heating procedure may be applied in conjunction with the present invention to discharge the inside gas.

Embodiment 8

A Manufacturing Method for a Bubble-Driven Type Optical Switch.

FIG. 17 illustrates the procedure of a liquid injection method in accordance with the eighth embodiment of the present invention. In this embodiment, a bubble-driven type optical switch is disclosed. A configuration of the optical switch that performs the liquid injection is the same one as that of illustrated in FIG. 4 except that the present embodiment makes changes in widths of the pouring slit, the driving slit, and the bypass slit, respectively. Thus, the optical switch of the present invention can be formed by the way as that of FIG. 4. A driving slit 5 on the side of optical waveguide substrate is $10 \mu m$ in width, $40 \mu m$ in depth, and $200 \mu m$ in length. Ideally, the bubble to be poured makes up about $\frac{1}{3}$ length of the driving slit 5. Therefore, the volume of bubble is $V=2.7 \times 10^4 \mu m^3$, and the volume of the groove is $Vs=1.6 \times 10^5 \mu m^3$. A surface tension of the oil 10 is 20 dyne/cm at room temperature, so that the pressure of the finally trapped gas is by $\Delta P=9.0 \times 10^3$ Pa higher than atmospheric pressure. Since 1 atm corresponds to about $1.0 \times 10^5$ Pa, the pressure of the trapped air is about $\frac{1}{10}$ higher than atmospheric pressure. The pressure P required for reducing the volume of the air in the groove to the required volume prior to pouring the oil 10 is expressed by the equation $$P=\{v/(Vs+Vi)\}(Po+\Delta P)$$

wherein Vi stands for the volume of the pouring slit and Po stands for the pressure of an atmospheric pressure.

If the cross-sectional area of the pouring slit is $10 \mu m \times 5 \mu m$ and a length thereof is $1000 \mu m$, then $P=1.4 \times 10^4$ Pa.

The procedure of liquid injection will be described below with reference to FIG. 17.

Figure 17A:
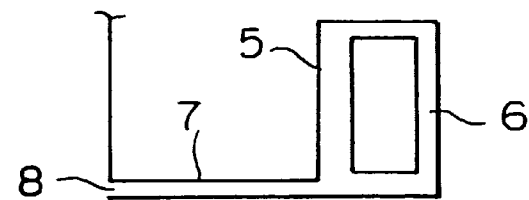
FIGS. 17A to 17F are schematic cross sectional views illustrating the procedure according to a seventh embodiment of the present invention.
Figure 17B:
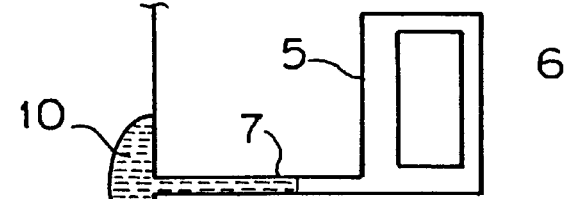
Figure 17C:
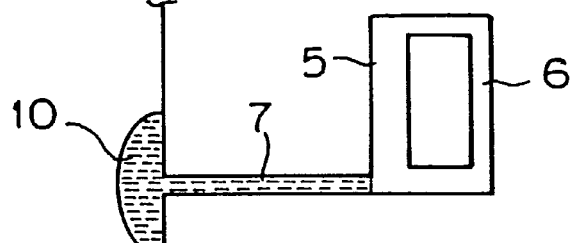
Figure 17D:
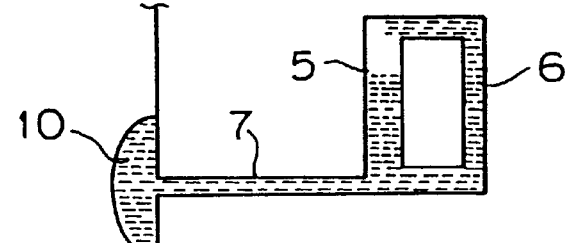
Figure 17E:
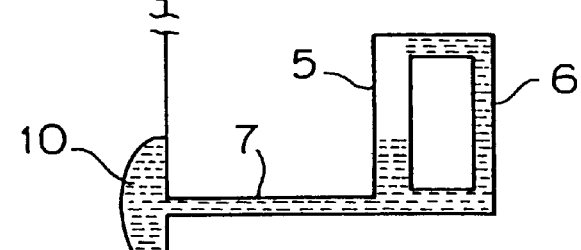
Figure 17F:
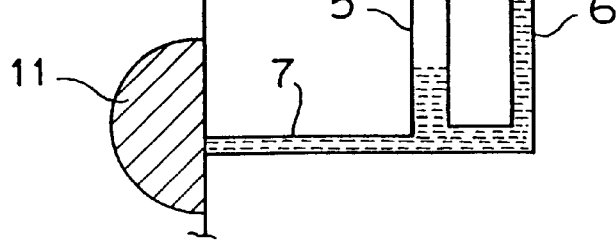

In the state of prior to inject oil as a refractive index-matching agent, the driving slit 5 and the pouring slit 7 are being empty (FIG. 17A). Then, the pressure is reduced to $P=1.4 \times 10^4$ Pa and the oil 10 is contacted with the pouring slit 7, causing a migration of the oil into the pouring slit 7 as an effect of surface tension (FIG. 17B), and the pouring slit 7 is filled with oil 10. Under such condition, if the oil receives the pressure of about 0.1 atm from the outside, the oil 10 is forcefully introduced into the bypass way and the driving slit 5. A liquid column is generated at a narrowed portion of the bypass slit 6, which is correspond to the portion of $5 \mu m$ in width in the present invention, and the bypass slit 6 is perfectly filled with the oil. Then the driving slit having a comparatively wide groove is also filed with the oil (FIG. 17D). This pressurizing condition allows that the bypass slit is filled with the oil and the bubble remains in the driving slit whether or not the groove width, the surface condition, and so on are different within the range of an accuracy of finishing. In this embodiment, everything is explained only for a single driving slit. It is needless to say that the method permits to treat a plurality of driving slits, or simultaneously applied to a plurality of optical switches for pouring the oil 10. Recovering to an atmospheric pressure after forcefully pouring the oil, the inside gas 39 discharges an excess part of the oil 10 and holds a predetermined volume of the gas (a bubble of the desired length) in the driving slit 5 to keep it in the state at the pressure of about $9.0 \times 10^3$ Pa higher than an atmospheric pressure (FIG. 17E). Under this condition, the pressures reach an equilibrium. Then, an excess part of the oil 10 at an inlet of the pouring slit 7 is wiped off and the inlet is sealed with an epoxy resin adhesive. Consequently, the liquid injection and the sealing are completely finished (FIG. 17F).

In the Embodiments, description is made that the oil 10 is kept in contact with the pouring slit's inlet 8. This is achieved by dropping a droplet of the oil 10 by a dropping pipette or the like in the present invention or by touching with a capillary or the like previously wetted with the oil 10. Of course, it is not limited to these techniques. Alternatively, for example, a substrate of the optical switch may be dipped into a bath of oil 10 to obtain the same effects as those of the above techniques. For the mass treatment, the latter technique will be more effective.

After completing the injection, an excess part of the oil 10 on the pouring slit's inlet 8 may be removed by another ways, for example the way of dipping the inlet 8 into alcohol for the washing, or the way of spraying alcohol or gust of air for blowing off.

In this embodiment, a seal material 11 for the seal is an epoxy resin adhesive but not limited to. A silicone rubber, a silicone resin, or the like may be used instead of the epoxy resin.

As described above, if a width of the bypass slit is larger than that of the driving slit, an optical switch in the type of driving the liquid column in the driving slit is constructed. On the other hand, if a width of the bypass slit is smaller than that of the driving slit, accompanying with the liquid injection, a liquid column is generated in the bypass slit prior to generate in the driving slit. Finally, the bubble is only remained in the driving slit, while all of the other places are in the state of being filled with the liquid. It results in an optical switch in the type of driving a bubble in the driving slit. In the latter case, there is no need to restrict each width of the bypass slit and the pouring slit. A width of the pouring slit may be smaller than that of the driving slit. The structure of optical switch and the method of manufacturing the optical switch in accordance with the present invention will be effective on an optical switch having any of the above configurations.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:
1. An optical switch comprising:
a substrate;
a lid fixed to said substrate, defining a space together with said substrate;
first and second optical waveguides provided in said substrate, said first and second optical waveguides crossing each other in said substrate; and
a refractive index-matching liquid having a refractive index which is substantially equal to that of said first and second optical waveguides, said liquid being present and movable in said first and second optical waveguides one from another depending on its position in said space;
wherein a movement of said refractive index-matching liquid is in response to a change in a surface tension of the refractive index-matching liquid by a thermal capillary phenomenon;
wherein said substrate comprises a base layer comprising silicon, and a silicon layer deposited on a top surface of said base layer;
wherein said lid is anodically bonded to said substrate through said silicon layer,
wherein said optical switch is provided with a passage through which said refractive index-matching liquid is poured and which communicates with said space at said crossing portion of said first and second optical waveguides,
wherein said space comprises a driving slit in which said refractive index-matching liquid is moved; and
a pouring slit for pouring said refractive index-matching liquid, communicating with said driving slit and having a width smaller than a width of said driving slit.

2. The optical switch as claimed in claim 1, wherein said base layer of said substrate consists of silicon and said lid consists of a Pyrex glass.

3. The optical switch as claimed in claim 1, wherein said base layer of said optical waveguide consists of quartz, and said lid consists of quartz having deposited thereon a borosilicate glass or a low alkali borosilicate glass.

4. The optical switch as claimed in claim 1, wherein said pouring slit is provided only in one position.

5. The optical switch as claimed in claim 1, further comprising means for driving said liquid in said space.

6. The optical switch as claimed in claim 5, wherein said means for deriving said liquid is means for heating said liquid.

7. The optical switch as claimed in claim 6, wherein said means for heating comprises a heater and a circuit for driving said heater.

8. The optical switch as claimed in claim 5, wherein said means for heating said liquid creates a gradient of temperature along the direction in which said liquid is driven.

9. The optical switch as claimed in claim 8, wherein said means for heating said liquid comprises a plurality of heaters.

10. An optical switch comprising:
a substrate;
a lid fixed to said substrate, defining a space together with said substrate;
first and second optical waveguides provided in said substrate, said first and second optical waveguides crossing each other in said substrate; and
a refractive index-matching liquid having a refractive index which is substantially equal to that of said first and second optical waveguides, said liquid being present and movable in said first and second optical waveguides one from another depending on its position in said space;

wherein a movement of said refractive index-matching liquid is in response to a change in a surface tension of the refractive index-matching liquid by a thermal capillary phenomenon;

wherein said substrate comprises a base layer comprising silicon, and a silicon layer deposited on a top surface of said base layer;

wherein said lid is anodically bonded to said substrate through said silicon layer, wherein said optical switch is provided with a passage through which said refractive index-matching liquid is poured and which communicates with said space at said crossing portion of said first and second optical waveguides, wherein said base layer of said substrate consists of silicon and said lid consists of a Pyrex glass, wherein said space comprises a driving slit in which said refractive index-matching liquid is moved; and wherein said space further comprises a pouring slit for pouring said refractive index-matching liquid, communicating with said driving slit and having a width smaller than a width of said driving slit.

11. The optical switch as claimed in claim 10, wherein said pouring slit is provided only in one position.

12. A method of assembling said optical switch that includes a substrate that comprises a base layer comprising silicon and a silicon layer deposited on a top surface of said base layer, a lid anodically bonded to said substrate through said silicon layer, defining a space together with said substrate, first and second optical waveguides provided in said substrate, said first and second optical waveguides crossing each other in said substrate, a refractive index-matching liquid having a refractive index which is substantially equal to that of said first and second optical waveguides, said liquid being present and movable in said first and second optical waveguides one from another depending on its position in said space, the movement of said refractive index-matching liquid being in response to a change in a surface tension of the refractive index-matching liquid by a thermal capillary phenomenon, a driving slit provided as a groove in which said refractive index-matching liquid is moved, and a pouring slit for pouring said refractive index-matching liquid, said driving slit and said pouring slit being connected together, said pouring slit having a width that is smaller than a width of said driving slit, said method comprising the steps of:

providing said substrate having said first and second optical waveguides formed therein, and providing said lid, one of said substrate and said lid having said groove, said space being provided at a crossing portion of said first and second optical waveguides and said groove communicating with said space, so that said space communicates with an outside through said groove after said lid has been bonded to said substrate;

bonding said substrate and said lid together by anodic bonding; and pouring said index-matching liquid into said groove.

13. The method of assembling said optical switch as claimed in claim 12, wherein said pouring slit is provided only in one position.

14. The method of assembling said optical switch as claimed in claim 13, further comprising the steps of:

dipping an inlet of said pouring slit into said refractive index-matching liquid; and regulating a volume of said refractive index-matching liquid to be poured into said driving slit by means of time-based regulation.

15. The method of assembling said optical switch as claimed in claim 13, further comprising the steps of:

dipping an inlet of said pouring slit into said index-matching liquid; and regulating a volume of said refractive index-matching liquid to be poured into said driving slit by means of temperature-based regulation.

16. The method of assembling said optical switch as claimed in claim 15, wherein said step of regulating a volume of said refractive index-matching liquid to be poured into said driving slit by means of temperature-based regulation, comprising sub-steps of:

holding a state at a temperature higher than a room temperature for a predetermined time; and returning said temperature to a room temperature.

17. The method of assembling said optical switch as claimed in claim 15, wherein said step of regulating a volume of said refractive index-matching liquid to be poured into said driving slit by means of temperature-based regulation, comprising sub-steps of:

holding a state at a temperature higher than a room temperature for a predetermined time;

dipping al inlet of said pouring slit into said refractive index-matching liquid; and returning said temperature to a room temperature.

18. The method of assembling said optical switch as claimed in claim 13, further comprising the steps of:

dipping an inlet of said pouring slit into said refractive index-matching liquid; and regulating a volume of said refractive index-matching liquid to be poured into said driving slit by means of pressure-based regulation.

19. The method of assembling said optical switch as claimed in claim 18, wherein said step of regulating a volume of said refractive index-matching liquid to be poured into said driving slit by means of pressure-based regulation, comprising sub-steps of:

dipping an inlet of said pouring slit into said index-matching liquid;

holding a state at a pressure lower than an atmospheric pressure for a predetermined time; and returning said pressure to an atmospheric pressure.

20. The method of assembling said optical switch as claimed in claim 18, wherein said step of regulating a volume of said refractive index-matching liquid to be poured into said driving slit by means of pressure-based regulation, comprising sub-steps of:

holding a state at a pressure lower than an atmospheric pressure for a predetermined time;

dipping an inlet of said pouring slit into said refractive index-matching liquid; and returning said temperature to an atmosphere pressure.

21. The method of assembling said optical switch as claimed in claim 13, further comprising the steps of:

applying a pressure on said refractive index-matching liquid after performing preceding steps; and removing said pressure from said refractive index-matching liquid.

22. The method of assembling said optical switch as claimed in claim 13, further comprising the steps of:

removing an excess part of said index-matching liquid after pouring said index-matching liquid into said groove; and sealing an opening of said groove with a sealant.

23. The method of assembling said optical switch as claimed in claim 22, wherein said sealant is at least one selected from a group of epoxy resin, silicone resin, and silicone rubber.

24. The method of assembling said optical switch as claimed in claim 12, further comprising the steps of:
dipping an inlet of said pouring slit into said refractive index-matching liquid; and
regulating a volume of said refractive index-matching liquid to be poured into said driving slit by means of time-based regulation.

25. The method of assembling said optical switch as claimed in claim 12, further comprising the steps of:
dipping an inlet of said pouring slit into said index-matching liquid; and
regulating a volume of said refractive index-matching liquid to be poured into said driving slit by means of temperature-based regulation.

26. The method of assembling said optical switch as claimed in claim 25, wherein
said step of regulating a volume of said refractive index-matching liquid to be poured into said driving slit by means of temperature-based regulation, comprising sub-steps of:
holding a state at a temperature higher than a room temperature for a predetermined time; and
returning said temperature to a room temperature.

27. The method of assembling said optical switch as claimed in claim 25, wherein
said step of regulating a volume of said refractive index-matching liquid to be poured into said driving slit by means of temperature-based regulation, comprising sub-steps of:
holding a state at a temperature higher than a room temperature for a predetermined time;
dipping an inlet of said pouring slit into said refractive index-matching liquid; and
returning said temperature to a room temperature.

28. The method of assembling said optical switch as claimed in claim 12, further comprising the steps of:
dipping an inlet of said pouring slit into said refractive index-matching liquid; and
regulating a volume of said refractive index-matching liquid to be poured into said driving slit by means of pressure-based regulation.

29. The method of assembling said optical switch as claimed in claim 28, wherein
said step of regulating a volume of said refractive index-matching liquid to be poured into said driving slit by means of pressure-based regulation, comprising sub-steps of:
dipping an inlet of said pouring slit into said index-matching liquid;
holding a state at a pressure lower than an atmospheric pressure for a predetermined time; and
returning said pressure to an atmospheric pressure.

30. The method of assembling said optical switch as claimed in claim 28, wherein
said step of regulating a volume of said refractive index-matching liquid to be poured into said driving slit by means of pressure-based regulation, comprising sub-steps of:
holding a state at a pressure lower than an atmospheric pressure for a predetermined time;
dipping an inlet of said pouring slit into said refractive index-matching liquid; and
returning said pressure to a room.

31. The method of assembling said optical switch as claimed in claim 12, further comprising the steps of:
applying a pressure on said refractive index-matching liquid after performing preceding steps; and
removing said pressure from said refractive index-matching liquid.

32. The method of assembling said optical switch as claimed in claim 12, further comprising the steps of:
removing an excess part of said index-matching liquid after pouring said index-matching liquid into said groove; and
sealing an opening of said groove with a sealant.

33. The method of assembling said optical switch as claimed in claim 32, wherein said sealant is at least one selected from a group of epoxy resin, silicone resin, and silicone rubber.

34. An optical switch, comprising:
an optical waveguide substrate having an optical waveguide layer deposited on said optical waveguide substrate;
first and a second optical waveguides formed in said optical waveguide layer, said first and second optical waveguides crossing each other;
a driving slit formed at the intersection of said first and second optical waveguides, said driving slit having a width, said driving slit dividing said first optical waveguide into segments that are disposed on opposite sides of said driving slit and also dividing said second optical waveguide into segments that are disposed on opposite sides of said driving slit;
a lid that is anodically bonded to said substrate;
a bypass slit, which communicates with said driving slit;
an injection or pouring slit having an inlet, said injection or pouring slit additionally having a width that is smaller than said with of said driving slit, said injection or pouring slit communicating with said driving slit;
a liquid having a refractive index which is substantially equal to that of the first and second optical waveguides, said liquid being present in said driving slit; and
a means for moving said liquid in said driving slit due to a thermally-induced change in surface tension.

35. The optical switch according to claim 34, wherein said means for moving said liquid comprises a means for heating said liquid.

36. The optical switch according to claim 35, wherein said means for heating said liquid comprises a heater and a circuit for driving said heater.

37. The optical switch according to claim 36, wherein said optical waveguide layer has a top surface, a heater layer comprised of said heater and said circuit for driving said heater is deposited on said top surface of said optical waveguide layer, said heater layer having a top surface.

38. The optical switch according to claim 37, further comprising an insulating layer, said insulating layer being deposited on the top surface of said heater layer, said insulating layer having a top surface.

39. The optical switch according to claim 38, wherein said insulating layer is comprised of glass.

40. The optical switch according to claim 38, further comprising a contact layer, said contact layer being deposited on the top surface of said insulating layer.

41. The optical switch according to claim 40, wherein said contact layer is comprised of silicon.

42. The optical switch according to claim 35, wherein said means for heating said liquid creates a gradient of temperature along the direction in which said liquid is moved.

43. The optical switch according to claim 42, wherein said means for heating said liquid comprises a plurality of heaters and a circuit for driving said plurality of heaters.

44. The optical switch according to claim 34, wherein said liquid is an oil.

45. The optical switch according to claim 34, wherein said optical waveguide substrate comprises silicon.

46. The optical switch according to claim 34, wherein said optical waveguides have a bottom cladding layer.

47. The optical switch according to claim 46, wherein said bottom cladding layer is glass.

48. The optical switch according to claim 46, wherein said optical waveguides further comprise a core layer deposited on said bottom cladding layer.

49. The optical switch according to claim 48, wherein said core layer is doped with a dopant.

50. The optical switch according to claim 48, wherein said optical waveguides further comprise an upper cladding layer deposited on said core layer.

51. The optical switch according to claim 50, wherein said bottom cladding layer is glass.

52. A method of assembling an optical switch as claimed in claim 34, comprising the steps of:

bonding said lid and said substrate together by anodic bonding; and pouring said liquid into said optical switch through an inlet of said injection or pouring slit.

53. The method of assembling an optical switch according to claim 52, further comprising the steps of:

dipping the inlet of said pouring slit into said liquid; and regulating a volume of said liquid to be poured into said driving slit via said pouring slit using temperature-based regulation.

54. The method of assembling said optical switch according to claim 53, wherein said temperature-based regulation is conducted by:

holding the temperature of the optical switch at a temperature higher than a room temperature for a predetermined time; and returning said temperature of said optical switch to a room temperature.

55. The method of assembling the optical switch according to claim 53, further comprising the steps of:

removing an excess part of said liquid from said pouring slit after pouring said liquid into said pouring slit; and sealing an open end of said inlet with a sealant.

56. The method of assembling an optical switch according to claim 52, further comprising the steps of:

dipping the inlet of said pouring slit into said liquid; and regulating a volume of said liquid to be poured into said driving slit via said pouring slit using time-based regulation.

57. The method of assembling an optical switch according to claim 52, further comprising the steps of:

dipping the inlet of said pouring slit into said liquid; and regulating a volume of said liquid to be poured into said driving slit via said pouring slit using pressure-based regulation.

58. The method of assembling the optical switch according to claim 57, wherein said means of pressure-based regulation is conducted by:

contacting the liquid to the inlet at a pressure lower than atmospheric pressure for a predetermined time; and returning said pressure to atmospheric pressure.

59. The method of assembling the optical switch according to claim 57, wherein said pressure-based regulation is conducted by:

applying a pressure on said liquid;

contacting the liquid to the inlet for a predetermined time; and removing said applied pressure from said liquid.

* * * * *